(12) United States Patent
Wu et al.

(10) Patent No.: US 12,532,378 B2
(45) Date of Patent: Jan. 20, 2026

(54) METHOD AND DEVICE IN UE AND BASE STATION USED FOR WIRELESS COMMUNICATION

(71) Applicant: Apogee Networks, LLC, Dallas, TX (US)

(72) Inventors: Keying Wu, Shanghai (CN); Xiaobo Zhang, Shanghai (CN); Lin Yang, Shanghai (CN)

(73) Assignee: Apogee Networks, LLC, Plano, TX (US)

( * ) Notice: Subject to any disclaimer, the term of this patent is extended or adjusted under 35 U.S.C. 154(b) by 500 days.

(21) Appl. No.: 17/155,114

(22) Filed: Jan. 22, 2021

(65) Prior Publication Data
US 2021/0144796 A1 May 13, 2021

Related U.S. Application Data

(63) Continuation of application No. PCT/CN2019/098840, filed on Aug. 1, 2019.

(30) Foreign Application Priority Data

Aug. 15, 2018 (CN) .......................... 201810926796.1

(51) Int. Cl.
*H04W 76/27* (2018.01)
*H04L 5/00* (2006.01)
(Continued)

(52) U.S. Cl.
CPC ........... *H04W 76/27* (2018.02); *H04L 5/0092* (2013.01); *H04W 72/0453* (2013.01); *H04W 72/20* (2023.01)

(58) Field of Classification Search
CPC ............ H04W 76/27; H04W 72/0453; H04W 72/20; H04W 72/23; H04W 72/21;
(Continued)

(56) References Cited

U.S. PATENT DOCUMENTS

2011/0002287 A1* 1/2011 Lin ....................... H04W 72/23
370/329
2017/0295006 A1 10/2017 Han
(Continued)

FOREIGN PATENT DOCUMENTS

CN 103416015 A 11/2013
CN 106550467 A * 3/2017 .......... H04W 72/042
(Continued)

OTHER PUBLICATIONS

ISR in application PCT/CN2019/098840 dated Sep. 28, 2019.
Qualcomm Incorporated."Summary of Maintenance for DL/UL Scheduling." 3GPPTSG-RAN WG1 Meeing #93, R1-1807752.25 May 2018 (May 25, 2018).
(Continued)

*Primary Examiner* — Khaled M Kassim
*Assistant Examiner* — Oladiran Gideon Olaleye
(74) *Attorney, Agent, or Firm* — Volpe Koenig

(57) ABSTRACT

A method and device in UE and base station used for wireless communications are disclosed in the present disclosure. A UE receives a first signaling; and transmits a first radio signal in a first radio resource. The first radio resource belongs to a first resource set of K resource set(s), any of the K resource set(s) comprising a positive integer number of radio resource(s), K being a positive integer; the first signaling is used for determining a target parameter set, and the target parameter set is a first parameter set or a second parameter set, the first parameter comprising a positive integer number of first-type parameter(s) and the second parameter comprising a positive integer number of second-type parameter(s); the target parameter set is used for determining the first radio resource. The method herein applies to all requirements of uplink transmission reliability in various application scenarios.

20 Claims, 22 Drawing Sheets

(51) Int. Cl.
*H04W 72/0453* (2023.01)
*H04W 72/20* (2023.01)

(58) Field of Classification Search
CPC ............. H04W 92/10; H04W 72/0446; H04W 72/542; H04L 5/0092; H04L 5/003; H04L 1/16; H04L 5/0005; H04L 5/0057
USPC ........................................................ 370/329
See application file for complete search history.

(56) References Cited

U.S. PATENT DOCUMENTS

| | | | |
|---|---|---|---|
| 2018/0097383 A1 | 4/2018 | Kato | |
| 2021/0258200 A1* | 8/2021 | Lee | ............ H04L 5/0051 |

FOREIGN PATENT DOCUMENTS

| | | | | |
|---|---|---|---|---|
| CN | 106877986 A | | 6/2017 | |
| CN | 107659349 A | * | 2/2018 | ........... H04B 7/0404 |
| CN | 107734661 A | | 2/2018 | |
| CN | 107846707 A | * | 3/2018 | ........... H04W 72/042 |
| CN | 108111281 A | | 6/2018 | |
| CN | 108207029 A | * | 6/2018 | ........... H04L 5/0005 |
| WO | WO-2017075787 A1 | * | 5/2017 | |
| WO | 2018027806 A1 | | 2/2018 | |
| WO | WO-2018024151 A1 | * | 2/2018 | ............ H04W 52/04 |
| WO | 2018072615 A1 | | 4/2018 | |
| WO | WO-2018120862 A1 | * | 7/2018 | ........... A01D 34/008 |
| WO | WO-2018142785 A1 | * | 8/2018 | ............... G08G 1/09 |

OTHER PUBLICATIONS

3rd Generation Partnership Project;Technical Specification Group Radio Access Network;NR;Physical layer procedures for control(Release 15) 3GPP TS 38.213 V15.2.0 Jun. 2018(Jun. 2018).
Huawei, HiSilicon"DCI design for URLLC" 3GPP TSG RAN WG1 Meeting #93 R1-1805902, May 11, 2018.
First Office Action received in application No. CN201810926796.1 dated Aug. 4, 2021.
First Search Report received in application No. CN201810926796.1 dated Jul. 27, 2021.
Third Generation Partnership Project, "Technical Specification Group Radio Access Network; NR; Physical channels and modulation (Release 15)," 3GPP TS 38.211 V15.2.0 (Jun. 2018).
Third Generation Partnership Project, "Technical Specification Group Radio Access Network; NR; Physical channels and modulation (Release 15)," 3GPP TS 38.211 V15.6.0 (Jun. 2019).
Third Generation Partnership Project, "Technical Specification Group Radio Access Network; NR; Multiplexing and channel coding (Release 15)," 3GPP TS 38.212 V15.2.0 (Jun. 2018).
Third Generation Partnership Project, "Technical Specification Group Radio Access Network; NR; Multiplexing and channel coding (Release 15)," 3GPP TS 38.212 V15.6.0 (Jun. 2019).
Third Generation Partnership Project, "Technical Specification Group Radio Access Network; NR; Physical layer procedures for control (Release 15)," 3GPP TS 38.213 V15.6.0 (Jun. 2019).
Third Generation Partnership Project, "Technical Specification Group Radio Access Network; NR; Radio Resource Control (RRC) protocol specification (Release 15)," 3GPP TS 38.331 V15.2.1 (Jun. 2018).
Third Generation Partnership Project, "Technical Specification Group Radio Access Network; NR; Radio Resource Control (RRC) protocol specification (Release 15)," 3GPP TS 38.331 V15.6.0 (Jun. 2019).

* cited by examiner

| First information | First sub-information | Second sub-information | ... |
|---|---|---|---|

FIG. 15

| Second information | Fifth sub-information | Sixth sub-information | ... |
|---|---|---|---|

FIG. 16

First signaling ⟶ Second radio signal ⟶ First radio signal

FIG. 19

METHOD AND DEVICE IN UE AND BASE STATION USED FOR WIRELESS COMMUNICATION

CROSS REFERENCE TO RELATED APPLICATIONS

This application is a continuation of International Application No. PCT/CN2019/098840, filed Aug. 1, 2019, claims the priority benefit of Chinese Patent Application No. 201810926796.1, filed on Aug. 15, 2018, the full disclosure of which is incorporated herein by reference.

BACKGROUND

Technical Field

The present disclosure relates to methods and devices in wireless communication systems, and in particular to a method and a device in a wireless communication system that support physical layer uplink control channel.

Related Art

Compared with a traditional 3rd Generation Partner Project (3GPP) Long-term Evolution (LTE) system, more various application scenarios can be supported in a 5G system, such as enhanced Mobile BroadBand (eMBB), Ultra-Reliable and Low Latency Communications (URLLC) and massive Machine-Type Communications (mMTC). Requirements of transmission reliability and latency vary according to application scenarios and some may differ from others in a couple of orders of magnitude, which leads to differences in designs of physical layer data channel and physical layer control channel required for application scenarios.

SUMMARY

Inventors find through researches that URLLC is much more demanding on transmission reliability than any other application scenario, including not only the transmission reliability of a physical layer data channel but also that of a physical layer control channel. The 3GPP Release 15 (R15) supports an adoption of multiple Modulation and Coding Scheme (MCS) tables and repeated transmissions to improve a physical layer data channel's transmission reliability. And the transmission reliability of a physical layer control channel also needs improving. Besides, designs for URLLC shall not be made at the cost of spectrum efficiency of other application scenarios.

To address the above problem, the present disclosure provides a solution. It should be noted that embodiments of the UE in the present disclosure and the characteristics of the embodiments can be applied to the base station in the present disclosure when there is no conflict, and vice versa. The embodiments of the present disclosure and the characteristics in the embodiments may be mutually combined if no conflict is incurred.

The present disclosure provides a method in a User Equipment (UE) for wireless communications, comprising:
receiving a first signaling; and
transmitting a first radio signal in a first radio resource;
herein, the first radio resource belongs to a first resource set of K resource set(s), and any of the K resource set(s) comprises a positive integer number of radio resource(s), K being a positive integer; the first signaling is used to determine a target parameter set, and the target parameter set is a first parameter set or a second parameter set, the first parameter set comprising a positive integer number of first-type parameter(s) and the second parameter set comprising a positive integer number of second-type parameter(s); the target parameter set is used to determine the first radio resource.

In one embodiment, a problem in the present disclosure to be solved is how to adapt transmission reliability to uplink transmissions in different application scenarios. The method proposed above enables a User Equipment (UE) to select the first radio resource from the K resource set(s) in a flexible way, hence a solution to the problem.

In one embodiment, the above method is characterized in that the first parameter set and the second parameter set respectively comprise maximum payload sizes that each radio resource in the K resource set(s) can bear under different requirements of uplink transmission reliability. The first signaling implicitly indicates the target parameter set from the first parameter set and the second parameter set, and the UE selects an appropriate radio resource from the K resource set(s) in accordance with a payload size that the first radio signal bears and the target parameter set for transmitting the first radio signal.

In one embodiment, the above method is characterized in that radio resources comprised in the K resource set(s) are designed as meeting various requirements for uplink transmission reliability, and the first parameter and the second parameter set respectively correspond to radio resources in the K resource set(s) that satisfy different requirements of uplink transmission reliability. The first signaling implicitly indicates the target parameter set from the first parameter set and the second parameter set, and the UE selects an appropriate radio resource from the K resource set(s) in accordance with the target parameter set for transmitting the first radio signal.

In one embodiment, the above method is characterized in that the K resource sets are designed as meeting a variety of requirements of uplink transmission reliability, and the first parameter set and the second parameter set respectively correspond to resource sets that meet different requirements of transmission reliability out of the K resource sets. The first signaling implicitly indicates the target parameter set from the first parameter set and the second parameter set, and the UE selects an appropriate resource set from the K resource sets in accordance with the target parameter set for transmitting the first radio signal.

In one embodiment, an advantage of the above method is to provide different kinds of uplink transmission reliabilities for the UE to choose from based on its needs, thereby ensuring high transmission reliability requested by some application scenarios without sacrificing the spectrum efficiency of the others that have lower requirements on transmission reliability.

In one embodiment, an advantage of the above method is to implicitly indicate a radio resource in a current uplink transmission via the first signaling, thereby cutting signaling overhead.

According to one aspect of the present disclosure, the first radio signal carries a first bit block, and a number of bits comprised in the first bit block is used to determine the first radio resource.

According to one aspect of the present disclosure, the first parameter set comprises K first-type parameter(s), while the second parameter set comprises K second-type parameter(s); the K first-type parameter(s) respectively corresponds(correspond) to the K resource set(s), and the K second-type parameter(s) respectively corresponds(correspond) to the K resource set(s).

According to one aspect of the present disclosure, comprising:
receiving K piece(s) of first-type information;
herein, the K piece(s) of first-type information respectively indicates(indicate) the K resource set(s).

According to one aspect of the present disclosure, the first parameter set comprises K1 first-type parameter(s), while the second parameter set comprises K2 second-type parameter(s); the K1 first-type parameter(s) respectively corresponds(correspond) to K1 resource set(s), while the K2 second-type parameter(s) respectively corresponds(correspond) to K2 resource set(s); when the target parameter set is the first parameter set, K is equal to K1 and the K resource set(s) is(are) the K1 resource set(s) respectively; when the target parameter is the second parameter set, K is equal to K2 and the K resource set(s) is(are) the K2 resource set(s) respectively; K1 and K2 are respectively positive integers.

According to one aspect of the present disclosure, comprising:
receiving K1 piece(s) of first-type information and K2 piece(s) of first-type information;
herein, the K1 piece(s) of first-type information respectively indicates(indicate) the K1 resource set(s), while the K2 piece(s) of first-type information respectively indicates(indicate) the K2 resource set(s).

According to one aspect of the present disclosure, comprising at least one of:
receiving J1 piece(s) of first-type sub-information; or
receiving J2 piece(s) of first-type sub-information;
herein, the J1 piece(s) of first-type sub-information respectively indicates(indicate) J1 first-type parameter(s), and the J2 piece(s) of first-type sub-information respectively indicates(indicate) J2 second-type parameter(s), each of the J1 first-type parameter(s) belongs to the first parameter set, and each of the J2 second-type parameter(s) belongs to the second parameter set, J1 being a positive integer no greater than a number of first-type parameters comprised in the first parameter set, J2 being a positive integer no greater than a number of second-type parameters comprised in the second parameter set.

According to one aspect of the present disclosure, the first signaling comprises a first field, and the first field of the first signaling is used to indicate the first radio resource out of the first resource set.

According to one aspect of the present disclosure, comprising:
receiving a second radio signal;
herein, the first signaling is used to determine configuration information of the second radio signal, and the first radio signal is a feedback on the second radio signal.

The present disclosure provides a method in a base station for wireless communications, comprising:
transmitting a first signaling; and
receiving a first radio signal in a first radio resource;
herein, the first radio resource belongs to a first resource set of K resource set(s), and any of the K resource set(s) comprises a positive integer number of radio resource(s), K being a positive integer; the first signaling is used to determine a target parameter set, and the target parameter set is a first parameter set or a second parameter set, the first parameter set comprising a positive integer number of first-type parameter(s) and the second parameter set comprising a positive integer number of second-type parameter(s); the target parameter set is used to determine the first radio resource.

According to one aspect of the present disclosure, the first radio signal carries a first bit block, and a number of bits comprised in the first bit block is used to determine the first radio resource.

According to one aspect of the present disclosure, the first parameter set comprises K first-type parameter(s), while the second parameter set comprises K second-type parameter(s); the K first-type parameter(s) respectively corresponds(correspond) to the K resource set(s), and the K second-type parameter(s) respectively corresponds(correspond) to the K resource set(s).

According to one aspect of the present disclosure, comprising:
transmitting K piece(s) of first-type information;
herein, the K piece(s) of first-type information respectively indicates(indicate) the K resource set(s).

According to one aspect of the present disclosure, the first parameter set comprises K1 first-type parameter(s), while the second parameter set comprises K2 second-type parameter(s); the K1 first-type parameter(s) respectively corresponds(correspond) to K1 resource set(s), while the K2 second-type parameter(s) respectively corresponds(correspond) to K2 resource set(s); when the target parameter set is the first parameter set, K is equal to K1 and the K resource set(s) is(are) the K1 resource set(s) respectively; when the target parameter is the second parameter set, K is equal to K2 and the K resource set(s) is(are) the K2 resource set(s) respectively; K1 and K2 are respectively positive integers.

According to one aspect of the present disclosure, comprising:
transmitting K1 piece(s) of first-type information and K2 piece(s) of first-type information;
herein, the K1 piece(s) of first-type information respectively indicates(indicate) the K1 resource set(s), while the K2 piece(s) of first-type information respectively indicates(indicate) the K2 resource set(s).

According to one aspect of the present disclosure, comprising at least one of:
transmitting J1 piece(s) of first-type sub-information; or
transmitting J2 piece(s) of first-type sub-information;
herein, the J1 piece(s) of first-type sub-information respectively indicates(indicate) J1 first-type parameter(s), and the J2 piece(s) of first-type sub-information respectively indicates(indicate) J2 second-type parameter(s), each of the J1 first-type parameter(s) belongs to the first parameter set, and each of the J2 second-type parameter(s) belongs to the second parameter set, J1 being a positive integer no greater than a number of first-type parameters comprised in the first parameter set, J2 being a positive integer no greater than a number of second-type parameters comprised in the second parameter set.

According to one aspect of the present disclosure, the first signaling comprises a first field, and the first field of the first signaling is used to indicate the first radio resource out of the first resource set.

According to one aspect of the present disclosure, comprising:
transmitting a second radio signal;
herein, the first signaling is used to determine configuration information of the second radio signal, and the first radio signal is a feedback on the second radio signal.

The present disclosure provides a UE for wireless communications, comprising:
  a first receiver, which receives a first signaling; and
  a first transmitter, which transmits a first radio signal in a first radio resource;
  herein, the first radio resource belongs to a first resource set of K resource set(s), and any of the K resource set(s) comprises a positive integer number of radio resource(s), K being a positive integer; the first signaling is used to determine a target parameter set, and the target parameter set is a first parameter set or a second parameter set, the first parameter set comprising a positive integer number of first-type parameter(s) and the second parameter set comprising a positive integer number of second-type parameter(s); the target parameter set is used to determine the first radio resource.

The present disclosure provides a base station for wireless communications, comprising:
  a second transmitter, which transmits a first signaling; and
  a second receiver, which receives a first radio signal in a first radio resource;
  herein, the first radio resource belongs to a first resource set of K resource set(s), and any of the K resource set(s) comprises a positive integer number of radio resource(s), K being a positive integer; the first signaling is used to determine a target parameter set, and the target parameter set is a first parameter set or a second parameter set, the first parameter set comprising a positive integer number of first-type parameter(s) and the second parameter set comprising a positive integer number of second-type parameter(s); the target parameter set is used to determine the first radio resource.

In one embodiment, the present disclosure is advantageous over the prior art in:
  providing multiple uplink transmission reliabilities for the UE to choose from according to actual needs so as to meet requirements of different application scenarios on uplink transmission reliability. Such practice ensures that requirements of application scenarios that demand higher transmission reliability can be satisfied, and meanwhile avoids the sacrifice of spectrum efficiency of some scenarios requiring lower transmission reliability.
  implicitly indicating radio resources requested by the current uplink transmission via a scheduling signaling, thus reducing signaling overhead.

BRIEF DESCRIPTION OF THE DRAWINGS

Other features, objects and advantages of the present disclosure will become more apparent from the detailed description of non-restrictive embodiments taken in conjunction with the following drawings:

FIG. 15 illustrates a schematic diagram of one of K piece(s) of first-type information according to one embodiment of the present disclosure.

FIG. 16 illustrates a schematic diagram of a piece of first-type information of K1 piece(s) of and K2 piece(s) of first-type information according to one embodiment of the present disclosure.

FIG. 19 illustrates a schematic diagram of relations among a first signaling, a second radio signal and a first radio signal according to one embodiment of the present disclosure.

DESCRIPTION OF THE EMBODIMENTS

Embodiment 1

Figure 1:
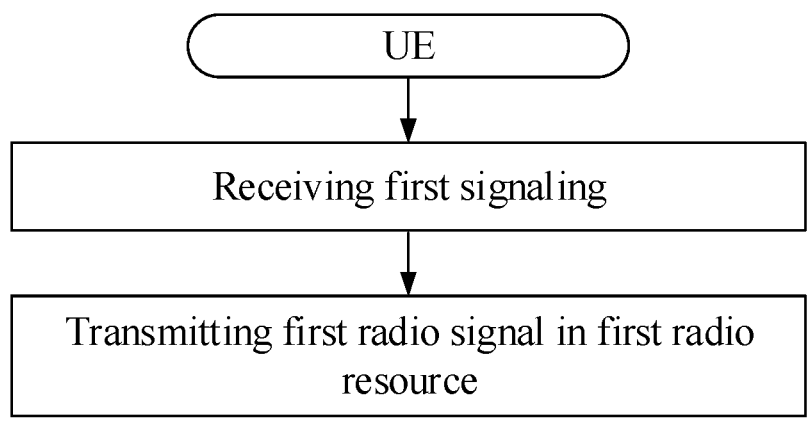
FIG. 1 illustrates a flowchart of a first signaling and a first radio signal according to one embodiment of the present disclosure.

Embodiment 1 illustrates a flowchart of a first signaling and a first radio signal; as shown in FIG. 1.

In Embodiment 1, the UE in the present disclosure receives a first signaling; and transmits a first radio signal in a first radio resource. Herein, the first radio resource belongs to a first resource set of K resource set(s), and any of the K resource set(s) comprises a positive integer number of radio resource(s), K being a positive integer; the first signaling is used to determine a target parameter set, and the target parameter set is a first parameter set or a second parameter set, the first parameter set comprising a positive integer number of first-type parameter(s) and the second parameter set comprising a positive integer number of second-type parameter(s); the target parameter set is used to determine the first radio resource.

In one embodiment, the first signaling is a dynamic signaling.

In one embodiment, the first signaling is a dynamic signaling used for DownLink Grant.

In one embodiment, the first radio resource comprises a time-frequency resource and a code-domain resource.

In one embodiment, a time-frequency resource comprises a positive integer number of Resource Element(s) (RE).

In one embodiment, a time-frequency resource comprises a positive integer number of multicarrier symbol(s) in time domain, and a positive integer number of subcarrier(s) in frequency domain.

In one embodiment, a code-domain resource comprises one or more of pseudo-random sequences, low-PAPR sequences, a cyclic shift, an Orthogonal Cover Code (OCC), an OCC length, an OCC index, an orthogonal sequence, $r_{u,v}^{(\alpha,\delta)}$ (n), $w_i$(m) or $w_n$(m). The $r_{u,v}^{(\alpha,\delta)}$ (n) is a pseudo-random sequence or a low-PAPR sequence, while the $w_i$(m) and the $w_n$(m) are orthogonal sequences, respectively. The specific meaning of the $r_{u,v}^{(\alpha,\delta)}$ (n), the $w_i$(m) and the $w_n$(m) can be found in 3GPP TS38.211, section 6.3.2.

In one embodiment, the first radio resource is a Physical Uplink Control CHannel (PUCCH) resource.

In one embodiment, a PUCCH resource is configured by a PUCCH-Resource Information Element (IE).

In one embodiment, the first radio resource is configured by a PUCCH-Resource IE.

In one embodiment, the specific meaning of PUCCH resource can be found in 3GPP TS38.213.

In one embodiment, the specific meaning of PUCCH-Resource IE can be found in 3GPP TS38.331.

In one embodiment, any radio resource in the K resource set(s) is a PUCCH resource.

In one embodiment, the first resource set is a PUCCH resource set.

In one embodiment, any resource set of the K resource set(s) is a PUCCH resource set.

In one embodiment, a PUCCH resource set is configured by a PUCCH-ResourceSet IE.

In one embodiment, the first resource set is configured by a PUCCH-ResourceSet IE.

In one embodiment, any resource set of the K resource set(s) is configured by a PUCCH-ResourceSet IE.

In one embodiment, the specific meaning of PUCCH resource set can be found in 3GPP TS38.213.

In one embodiment, the specific meaning of PUCCH-ResourceSet can be found in 3GPP TS38.331.

In one embodiment, the first radio signal comprises Uplink control information (UCI).

In one embodiment, the first radio signal comprises Hybrid Automatic Repeat reQuest-Acknowledgement (HARQ-ACK).

In one embodiment, the first radio signal comprises a Scheduling Request (SR).

In one embodiment, the first radio signal comprises a Channel-state information (CRI) reference signals Resource Indicator.

In one embodiment, the first radio signal comprises Channel State Information (CSI).

In one subembodiment, the CSI comprises one or more of a Rank Indicator (RI), a CRI, a Precoding Matrix Indicator (PMI), a Reference Signal Received Power (RSRP), a Reference Signal Received Quality (RSRQ) or a Channel Quality Indicator (CQI).

In one embodiment, the first signaling is used to determine the target parameter set between the first parameter set and the second parameter set.

In one embodiment, the phrase that the first signaling is used to determine a target parameter set includes that a format of the first signaling is used to determine the target parameter set between the first parameter set and the second parameter set.

In one embodiment, the format of the first signaling is one of a DCI format 0_0, a DCI format 0_1, a DCI format 1_0, a DCI format 0_1 and a compact DCI format.

In one embodiment, the phrase that the first signaling is used to determine a target parameter set includes that an identifier of the first signaling is used to determine the target parameter set between the first parameter set and the second parameter set.

In one embodiment, the identifier of the first signaling is one of a Cell-Radio Network Temporary Identifier (C-RNTI), a Configured Scheduling (CS)-RNTI and a new-RNTI.

In one embodiment, a format of the first signaling is used to determine the first radio resource.

In one embodiment, an identifier of the first signaling is used to determine the first radio resource.

In one embodiment, at least one first-type parameter in the first parameter set corresponds to value of a maxPayloadMinus1.

In one embodiment, at least one second-type parameter in the second parameter set corresponds to value of a maxPayloadMinus1.

In one embodiment, the specific meaning of maxPayloadMinus1 can be found in 3GPP TS38.331.

In one embodiment, at least one first-type parameter in the first parameter set is pre-defined (i.e., no need for configuring).

In one embodiment, at least one second-type parameter in the second parameter set is pre-defined (i.e., no need for configuring).

In one embodiment, the phrase that the target parameter set is used to determine the first radio resource means that whether the target parameter set is the first parameter set or the second parameter set is used to determine the first radio resource.

In one embodiment, the target parameter set is used to determine the first resource set.

In one embodiment, whether the target parameter set is the first parameter set or the second parameter set is used to determine the first resource set.

In one embodiment, transmitting power of the first radio signal is related to the target parameter set.

In one embodiment, an antenna port for transmitting the first radio signal is related to the target parameter set.

In one embodiment, the first signaling is transmitted on a downlink physical layer control channel (i.e., a downlink channel only capable of carrying a physical layer signaling).

In one embodiment, the downlink physical layer control channel is a Physical Downlink Control CHannel (PDCCH).

In one embodiment, the downlink physical layer control channel is a short PDCCH (sPDCCH).

In one embodiment, the downlink physical layer control channel is a New Radio PDCCH (NR-PDCCH).

In one embodiment, the downlink physical layer control channel is a Narrow Band PDCCH (NB-PDCCH).

In one embodiment, the first radio signal is transmitted on an uplink physical layer control channel (i.e., an uplink channel only capable of carrying a physical layer signaling).

In one embodiment, the uplink physical layer control channel is a PUCCH.

In one embodiment, the uplink physical layer control channel is a short PUCCH (sPUCCH).

In one embodiment, the uplink physical layer control channel is a New Radio PUCCH (NR-PUCCH).

In one embodiment, the uplink physical layer control channel is a Narrow Band PUCCH (NB-PUCCH).

Embodiment 2

Figure 2:
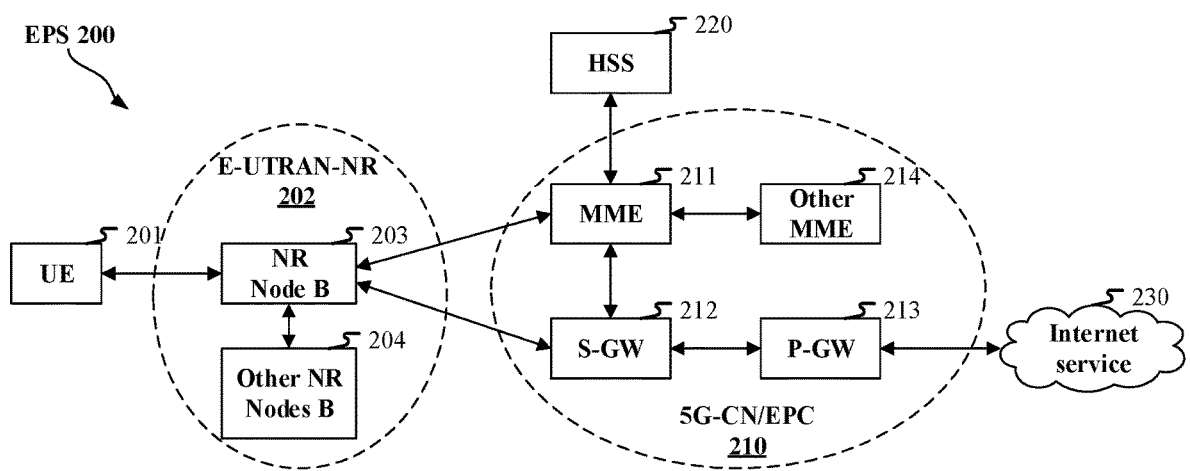
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of Long-Term Evolution (LTE), and Long-Term Evolution Advanced (LTE-A) and future 5G systems. The network architecture 200 of LTE may be called an Evolved Packet System (EPS) 200. The EPS 200 may comprise one or more UEs 201, an E-UTRAN-NR 202, a 5G-CoreNetwork/Evolved Packet Core (5G-CN/EPC) 210, a Home Subscriber Server (HSS) 220 and an Internet Service 230. Herein, the UMTS refers to Universal Mobile Telecommunications System. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services. The E-UTRAN-NR 202 comprises an evolved node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistant (PDA), Satellite Radios, Global Positioning System (GPS), multimedia devices, video devices, digital audio players (for example, MP3 players), cameras, games consoles, unmanned aerial vehicles, air vehicles, narrow-band physical network equipment, machine-type communication equipment, land vehicles, automobiles, wearables, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, automobile, vehicle or some other appropriate terms. The gNB 203 is connected with the 5G-CN/EPC 210 via an S1 interface. The 5G-CN/EPC 210 comprises a Mobility Management Entity (MME) 211, other MMEs 214, a Service Gateway (S-GW) 212 and a Packet Date Network Gateway (P-GW) 213. The MME 211 is a control node for processing a signaling between the UE 201 and the 5G-CN/EPC 210. Generally, the MME 211 provides bearer and connection management. All user Internet Protocol (IP) packets are transmitted through the S-GW 212; the S-GW 212 is connected to the P-GW 213. The P-GW 213 provides UE IP address allocation and other functions. The P-GW 213 is connected to the Internet Service 230. The Internet Service 230 comprises operator-compatible IP services, specifically including Internet, Intranet, IP Multimedia Subsystem (IMS) and Packet Switching Services.

In one embodiment, the gNB 203 corresponds to the base station in the present disclosure.

In one embodiment, the UE 201 corresponds to the UE in the present disclosure.

In one embodiment, the gNB 203 supports transmission on an uplink physical layer control channel.

In one embodiment, the UE 201 supports transmission on an uplink physical layer control channel.

Embodiment 3

Figure 3:
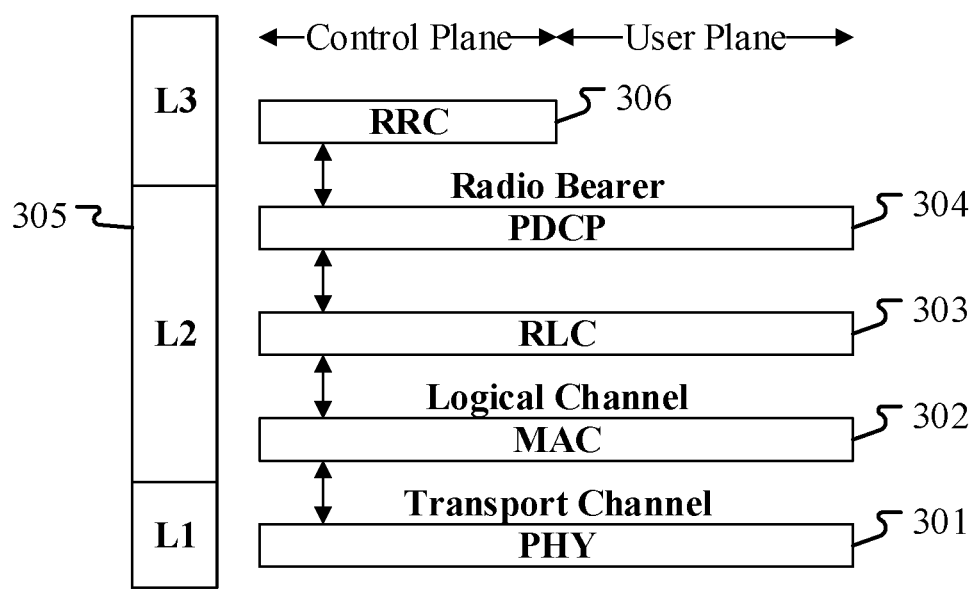
FIG. 3 illustrates a schematic diagram of an example of a radio protocol architecture of a user plane and a control plane according to one embodiment of the present disclosure.

Embodiment 3 illustrates a schematic diagram of a radio protocol architecture of a user plane and a control plane, as shown in FIG. 3.

FIG. 3 is a schematic diagram illustrating a radio protocol architecture of a user plane and a control plane. In FIG. 3, the radio protocol architecture for a UE and a gNB is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several protocol layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between UEs various radio resources (i.e., resource blocks) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises an RRC sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the UE in the present disclosure.

In one embodiment, the radio protocol architecture in FIG. 3 is applicable to the base station in the present disclosure.

In one embodiment, the first signaling in the present disclosure is generated by the PHY301.

In one embodiment, the first signaling in the present disclosure is generated by the MAC sublayer 302.

In one embodiment, the first radio signal in the present disclosure is generated by the PHY301.

In one embodiment, the first bit block in the present disclosure is generated by the PHY301.

In one embodiment, the K piece(s) of first-type information in the present disclosure is(are) generated by the RRC sublayer 306.

In one embodiment, the K1 piece(s) of first-type information in the present disclosure is(are) generated by the RRC sublayer 306.

In one embodiment, the K2 piece(s) of first-type information in the present disclosure is(are) generated by the RRC sublayer 306.

In one embodiment, the J1 piece(s) of first-type sub-information in the present disclosure is(are) generated by the RRC sublayer 306.

In one embodiment, the J2 piece(s) of first-type sub-information in the present disclosure is(are) generated by the RRC sublayer 306.

In one embodiment, the second radio signal in the present disclosure is generated by the PHY301.

Embodiment 4

Figure 4:
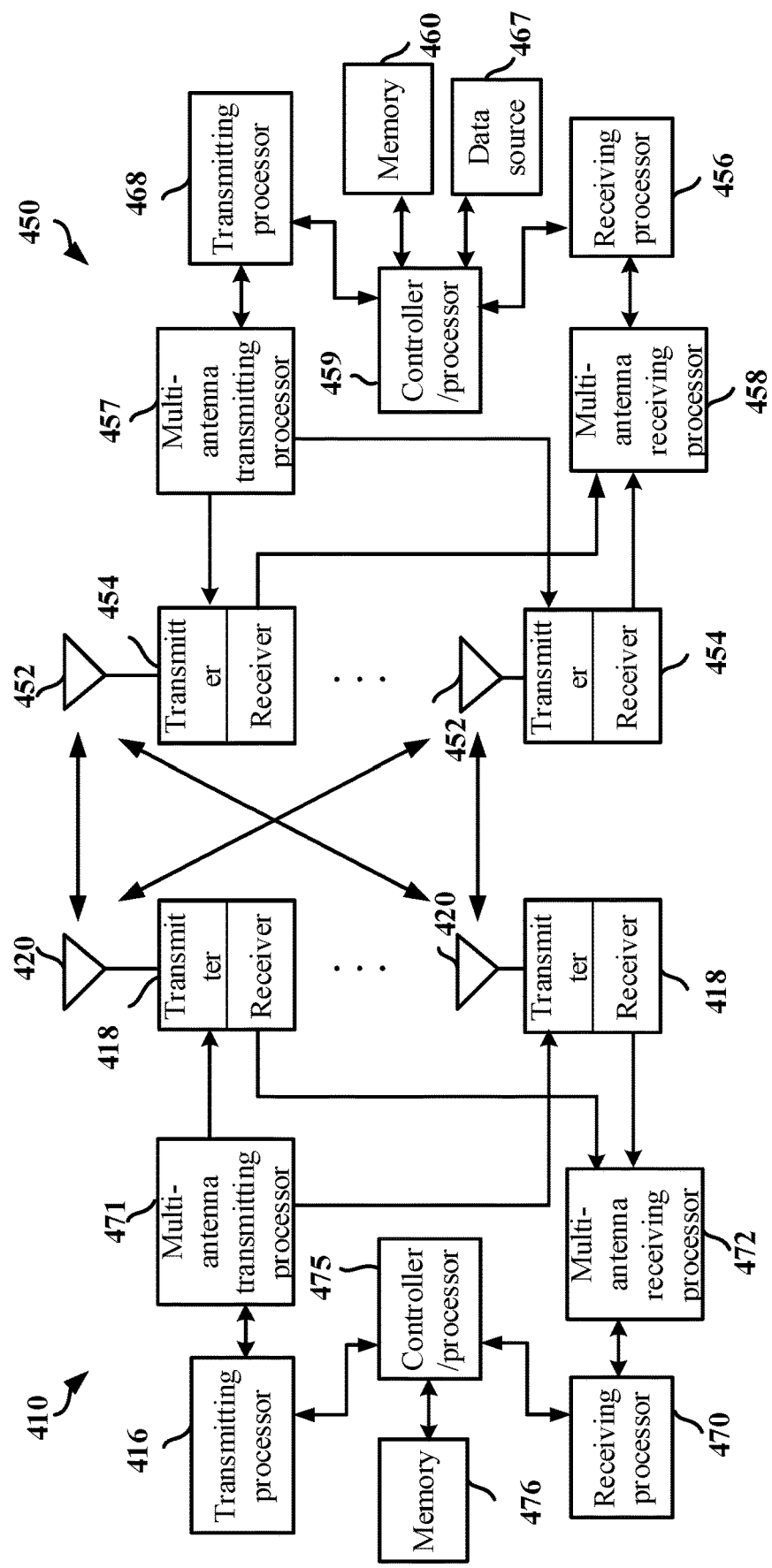
FIG. 4 illustrates a schematic diagram of a New Radio (NR) node and a UE according to one embodiment of the present disclosure.

Embodiment 4 illustrates a schematic diagram of a New Radio (NR) node and a UE, as shown in FIG. 4. FIG. 4 is a block diagram illustrating a UE 450 and a gNB 410 that are in communication with each other in access network.

The gNB 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The UE 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In downlink (DL) transmission, at the gNB 410, a higher-layer packet from a core network is provided to the controller/processor 475. The controller/processor 475 provides functions of the L2 layer. In DL transmission, the controller/processor 475 provides header compression, encryption, packet segmentation and reordering, and multiplexing between a logical channel and a transport channel, and radio resource allocation for the UE 450 based on various priorities. The controller/processor 475 is also in charge of HARQ operation, retransmission of a lost packet, and a signaling to the UE450. The transmitting processor 416 and the multi-antenna transmitting processor 471 perform signal processing functions used for the L1 layer (that is, PHY). The transmitting processor 416 performs coding and interleaving so as to ensure an FEC (Forward Error Correction) at the UE 450 side, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In downlink (DL) transmission, at the UE 450, each receiver 454 receives a signal via a corresponding antenna 452. Each receiver 454 recovers information modulated onto the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any UE 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the gNB 410. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In DL, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing. The controller/processor 459 also performs error detection using ACK and/or NACK protocols as a way to support HARQ operation.

In uplink (UL) transmission, at the UE 450, the data source 467 is used to provide a higher-layer packet to the controller/processor 459. The data source 467 represents all protocol layers above the L2 layer. Similar to a transmitting function of the gNB 410 described in DL transmission, the controller/processor 459 performs header compression, encryption, packet segmentation and reordering, and multiplexing between a logical channel and a transport channel based on radio resource allocation of the gNB 410 so as to provide the L2 layer functions used for the user plane and the control plane. The controller/processor 459 is also responsible for HARQ operation, retransmission of a lost packet, and a signaling to the gNB 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In uplink (UL) transmission, the function of the gNB 410 is similar to the receiving function of the UE 450 described in DL transmission. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be associated with the memory 476 that stores program code and data. The memory 476 can be called a computer readable medium. In UL transmission, the controller/processor 475 provides demultiplexing between a transport channel and a logical channel, packet reassembling, decryption, header decompression, control signal processing so as to recover a higher-layer packet from the UE 450. The higher-layer packet coming from the controller/processor 475 may be provided to the core network. The controller/processor 475 can also perform error detection using ACK and/or NACK protocols to support HARQ operation.

In one embodiment, the UE 450 comprises at least one processor and at least one memory. The at least one memory includes computer program codes. The at least one memory and the computer program codes are configured to be used in collaboration with the at least one processor. The UE 450 at least receives the first signaling in the present disclosure; and transmits the first radio signal in the first radio resource in the present disclosure. Herein, the first radio resource belongs to a first resource set of K resource set(s), and any of the K resource set(s) comprises a positive integer number of radio resource(s), K being a positive integer; the first signaling is used to determine a target parameter set, and the target parameter set is a first parameter set or a second parameter set, the first parameter set comprising a positive integer number of first-type parameter(s) and the second parameter set comprising a positive integer number of second-type parameter(s); the target parameter set is used to determine the first radio resource.

In one embodiment, the UE 450 comprises a memory that stores a computer readable instruction program. The computer readable instruction program generates actions when executed by at least one processor. The actions include: receiving the first signaling in the present disclosure; and transmitting the first radio signal in the first radio resource in the present disclosure. Herein, the first radio resource belongs to a first resource set of K resource set(s), and any of the K resource set(s) comprises a positive integer number of radio resource(s), K being a positive integer; the first signaling is used to determine a target parameter set, and the target parameter set is a first parameter set or a second parameter set, the first parameter set comprising a positive integer number of first-type parameter(s) and the second parameter set comprising a positive integer number of second-type parameter(s); the target parameter set is used to determine the first radio resource.

In one embodiment, the gNB 410 comprises at least one processor and at least one memory. The at least one memory includes computer program codes. The at least one memory and the computer program codes are configured to be used in collaboration with the at least one processor. The gNB 410 at least transmits the first signaling in the present disclosure; and receives the first radio signal in the first radio resource in the present disclosure. Herein, the first radio resource belongs to a first resource set of K resource set(s), and any of the K resource set(s) comprises a positive integer number of radio resource(s), K being a positive integer; the first signaling is used to determine a target parameter set, and the target parameter set is a first parameter set or a second parameter set, the first parameter set comprising a positive integer number of first-type parameter(s) and the second parameter set comprising a positive integer number of second-type parameter(s); the target parameter set is used to determine the first radio resource.

In one embodiment, the gNB 410 comprises a memory that stores a computer readable instruction program. The computer readable instruction program generates actions when executed by at least one processor. The actions include: transmitting the first signaling in the present disclosure; and receiving the first radio signal in the first radio resource in the present disclosure. Herein, the first radio resource belongs to a first resource set of K resource set(s), and any of the K resource set(s) comprises a positive integer number of radio resource(s), K being a positive integer; the first signaling is used to determine a target parameter set, and the target parameter set is a first parameter set or a second parameter set, the first parameter set comprising a positive integer number of first-type parameter(s) and the second parameter set comprising a positive integer number of second-type parameter(s); the target parameter set is used to determine the first radio resource.

In one embodiment, the gNB410 corresponds to the base station in the present disclosure.

In one embodiment, the UE450 corresponds to the UE in the present disclosure.

In one embodiment, at least one of the antenna 452, the receiver 454, the receiving processor 456, the multi-antenna receiving processor 458, the controller/processor 459, the memory 460 or the data source 467 is used to receive the first signaling in the present disclosure; at least one of the antenna 420, the transmitter 418, the transmitting processor 416, the multi-antenna transmitting processor 471, the controller/processor 475 or the memory 476 is used to transmit the first signaling in the present disclosure.

In one embodiment, at least one of the antenna 420, the receiver 418, the receiving processor 470, the multi-antenna receiving processor 472, the controller/processor 475 or the memory 476 is used to receive the first radio signal in the first radio resource in the present disclosure; at least one of the antenna 452, the transmitter 454, the transmitting processor 468, the multi-antenna transmitting processor 457, the controller/processor 459, the memory 460 or the data source 467 is used to transmit the first radio signal in the first radio resource in the present disclosure.

In one embodiment, at least one of the antenna 452, the receiver 454, the receiving processor 456, the multi-antenna receiving processor 458, the controller/processor 459, the memory 460 or the data source 467 is used to receive the K piece(s) of first-type information in the present disclosure; at least one of the antenna 420, the transmitter 418, the transmitting processor 416, the multi-antenna transmitting processor 471, the controller/processor 475 or the memory 476 is used to transmit the K piece(s) of first-type information in the present disclosure.

In one embodiment, at least one of the antenna 452, the receiver 454, the receiving processor 456, the multi-antenna receiving processor 458, the controller/processor 459, the memory 460 or the data source 467 is used to receive the K1 piece(s) of first-type information in the present disclosure; at least one of the antenna 420, the transmitter 418, the transmitting processor 416, the multi-antenna transmitting processor 471, the controller/processor 475 or the memory 476 is used to transmit the K1 piece(s) of first-type information in the present disclosure.

In one embodiment, at least one of the antenna 452, the receiver 454, the receiving processor 456, the multi-antenna receiving processor 458, the controller/processor 459, the memory 460 or the data source 467 is used to receive the K2 piece(s) of first-type information in the present disclosure; at least one of the antenna 420, the transmitter 418, the transmitting processor 416, the multi-antenna transmitting processor 471, the controller/processor 475 or the memory 476 is used to transmit the K2 piece(s) of first-type information in the present disclosure.

In one embodiment, at least one of the antenna 452, the receiver 454, the receiving processor 456, the multi-antenna receiving processor 458, the controller/processor 459, the memory 460 or the data source 467 is used to receive the J1 piece(s) of first-type sub-information in the present disclosure; at least one of the antenna 420, the transmitter 418, the transmitting processor 416, the multi-antenna transmitting processor 471, the controller/processor 475 or the memory 476 is used to transmit the J1 piece(s) of first-type sub-information in the present disclosure.

In one embodiment, at least one of the antenna 452, the receiver 454, the receiving processor 456, the multi-antenna receiving processor 458, the controller/processor 459, the memory 460 or the data source 467 is used to receive the J2 piece(s) of first-type sub-information in the present disclosure; at least one of the antenna 420, the transmitter 418, the transmitting processor 416, the multi-antenna transmitting processor 471, the controller/processor 475 or the memory 476 is used to transmit the J2 piece(s) of first-type sub-information in the present disclosure.

In one embodiment, at least one of the antenna 452, the receiver 454, the receiving processor 456, the multi-antenna receiving processor 458, the controller/processor 459, the memory 460 or the data source 467 is used to receive the second radio signal in the present disclosure; at least one of the antenna 420, the transmitter 418, the transmitting processor 416, the multi-antenna transmitting processor 471, the controller/processor 475 or the memory 476 is used to transmit the second radio signal in the present disclosure.

Embodiment 5

Figure 5:
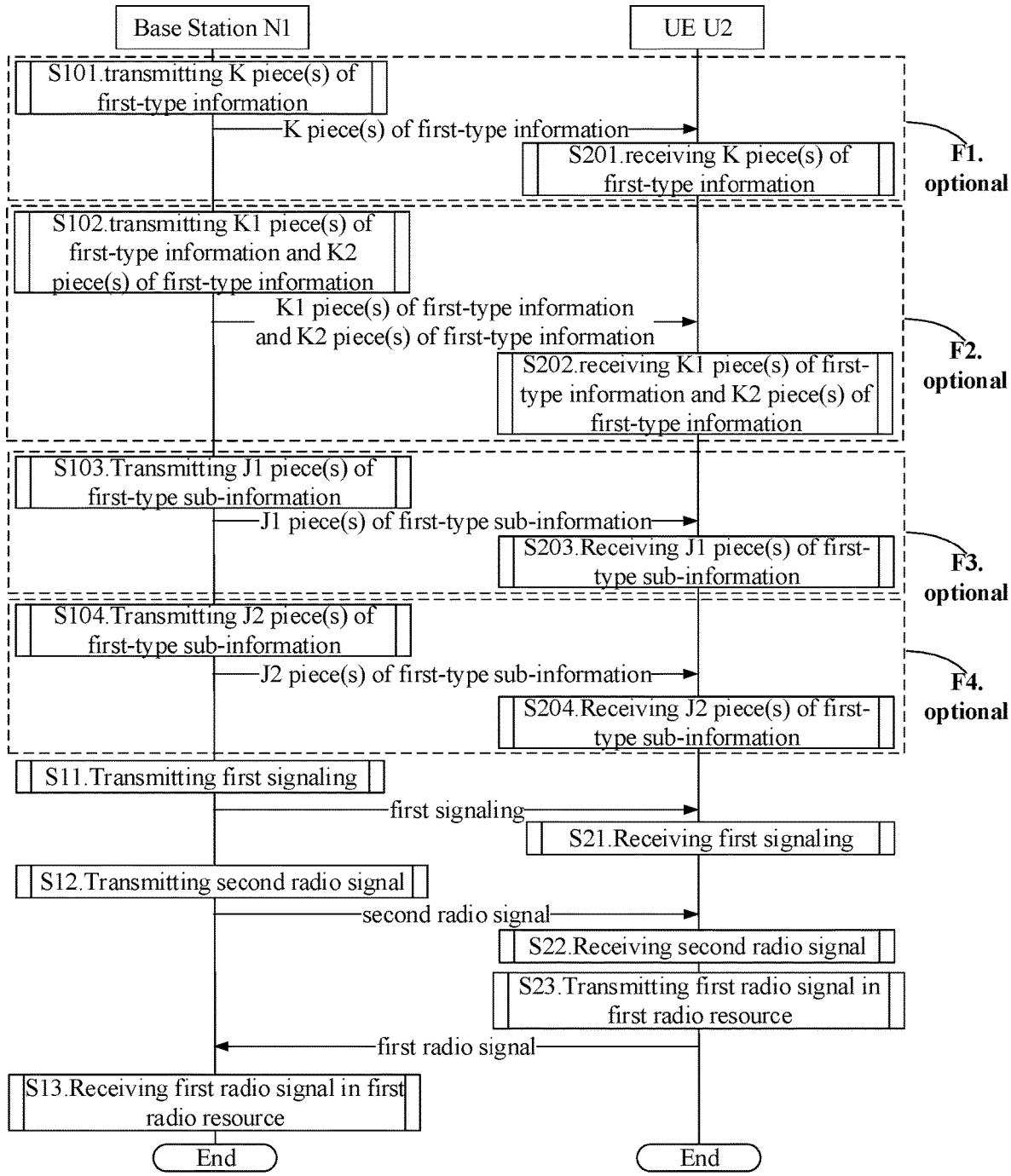
FIG. 5 illustrates a flowchart of wireless transmission according to one embodiment of the present disclosure.

Embodiment 5 illustrates a flowchart of wireless transmission, as shown in FIG. 5. In FIG. 5, a base station N1 is a maintenance base station for a serving cell of a UE U2. In FIG. 5, steps marked by boxes F1-F4 are optional, respectively, of which the box F1 and the box F2 do not coexist.

The N1 transmits K piece(s) of first-type information in step S101; transmits K1 piece(s) of first-type information and K2 piece(s) of first-type information in step S102; transmits J1 piece(s) of first-type sub-information in step S103; and transmits J2 piece(s) of first-type sub-information in step S104; transmits a first signaling in step S11; transmits a second radio signal in step S12; and receives a first radio signal in a first radio resource in step S13.

The U2 receives K piece(s) of first-type information in step S201; receives K1 piece(s) of first-type information and K2 piece(s) of first-type information in step S202; receives J1 piece(s) of first-type sub-information in step S203; and receives J2 piece(s) of first-type sub-information in step S204; receives a first signaling in step S21; receives a second radio signal in step S22; and transmits a first radio signal in a first radio resource in step S23.

In Embodiment 5, the first radio resource belongs to a first resource set of K resource set(s), and any of the K resource set(s) comprises a positive integer number of radio resource(s), K being a positive integer; the first signaling is used by the U2 to determine a target parameter set, and the target parameter set is a first parameter set or a second parameter set, the first parameter set comprising a positive integer number of first-type parameter(s) and the second parameter set comprising a positive integer number of second-type parameter(s); the target parameter set is used by the U2 to determine the first radio resource. If the box F2 in FIG. 5 exists, the K resource set(s) is(are) respectively K1 resource set(s) or K2 resource set(s), the K1 piece(s) of first-type information respectively indicating the K1 resource set(s) and the K2 piece(s) of first-type information respectively indicating the K2 resource set(s). The J1 piece(s) of first-type sub-information respectively indicates (indicate) J1 first-type parameter(s), while the J2 piece(s) of first-type sub-information respectively indicates(indicate) J2 second-type parameter(s), each of the J1 first-type parameter(s) belongs to the first parameter set, and each of the J2 second-type parameter(s) belongs to the second parameter set, J1 being a positive integer no greater than a number of first-type parameters comprised in the first parameter set, J2 being a positive integer no greater than a number of second-type parameters comprised in the second parameter set. The first signaling is used by the U2 to determine configuration information of the second radio signal, the first radio signal being a feedback on the second radio signal.

In one embodiment, the N1 is the base station in the present disclosure.

In one embodiment, the U2 is the UE in the present disclosure.

In one embodiment, the first radio signal carries a first bit block, and a number of bits comprised in the first bit block is used by the U2 to determine the first radio resource.

In one embodiment, the first parameter set comprises K first-type parameter(s), while the second parameter set comprises K second-type parameter(s); the K first-type parameter(s) respectively corresponds(correspond) to the K resource set(s), and the K second-type parameter(s) respectively corresponds(correspond) to the K resource set(s).

In one subembodiment, the box F1 in FIG. 5 exists, and the box F2 in FIG. 5 does not.

In one embodiment, the first parameter set comprises K1 first-type parameter(s), while the second parameter set comprises K2 second-type parameter(s); the K1 first-type parameter(s) respectively corresponds(correspond) to K1 resource set(s), while the K2 second-type parameter(s) respectively corresponds(correspond) to K2 resource set(s); when the target parameter set is the first parameter set, K is equal to K1 and the K resource set(s) is(are) the K1 resource set(s) respectively; when the target parameter is the second parameter set, K is equal to K2 and the K resource set(s) is(are) the K2 resource set(s) respectively; K1 and K2 are respectively positive integers.

In one subembodiment, the box F2 in FIG. 5 exists, and the box F1 in FIG. 5 does not.

In one embodiment, the UE in the present disclosure only receives the J1 piece(s) of first-type sub-information between the J1 piece(s) of first-type sub-information and the J2 piece(s) of first-type sub-information.

In one embodiment, the UE in the present disclosure only receives the J2 piece(s) of first-type sub-information between the J1 piece(s) of first-type sub-information and the J2 piece(s) of first-type sub-information.

In one embodiment, the UE in the present disclosure receives the J1 piece(s) of first-type sub-information and the J2 piece(s) of first-type sub-information.

In one embodiment, the first signaling comprises a first field, and the first field of the first signaling is used to indicate the first radio resource out of the first resource set.

In one embodiment, the second radio signal comprises downlink data, and the phrase that the first radio signal is a feedback on the second radio signal means that the first radio signal indicates whether the second radio signal is correctly received.

In one embodiment, the second radio signal is transmitted on a downlink physical layer data channel (i.e., a downlink channel capable of carrying physical layer data).

In one embodiment, the second radio signal comprises a downlink reference signal, and the phrase that the first radio signal is a feedback on the second radio signal means that a measurement on the second radio signal is used to generate the first radio signal.

In one embodiment, the K piece(s) of first-type information is(are) respectively transmitted on downlink physical layer data channel(s).

In one embodiment, the K piece(s) of first-type information is(are) transmitted on a same downlink physical layer data channel.

In one embodiment, the K piece(s) of first-type information is(are) respectively transmitted on K downlink physical layer data channel(s).

In one embodiment, at least two of the K pieces of first-type information are transmitted on a same downlink physical layer data channel.

In one embodiment, at least two of the K pieces of first-type information are transmitted on different downlink physical layer data channels.

In one embodiment, the K1 piece(s) of first-type information is(are) respectively transmitted on downlink physical layer data channel(s).

In one embodiment, the K1 piece(s) of first-type information is(are) transmitted on a same downlink physical layer data channel.

In one embodiment, the K1 piece(s) of first-type information is(are) respectively transmitted on K1 downlink physical layer data channel(s).

In one embodiment, at least two of the K1 pieces of first-type information are transmitted on a same downlink physical layer data channel.

In one embodiment, at least two of the K1 pieces of first-type information are transmitted on different downlink physical layer data channels.

In one embodiment, the K2 piece(s) of first-type information is(are) respectively transmitted on downlink physical layer data channel(s).

In one embodiment, the K2 piece(s) of first-type information is(are) transmitted on a same downlink physical layer data channel.

In one embodiment, the K2 piece(s) of first-type information is(are) respectively transmitted on K2 downlink physical layer data channel(s).

In one embodiment, at least two of the K2 pieces of first-type information are transmitted on a same downlink physical layer data channel.

In one embodiment, at least two of the K2 pieces of first-type information are transmitted on different downlink physical layer data channels.

In one embodiment, the K1 piece(s) of first-type information and the K2 piece(s) of first-type information are transmitted on a same downlink physical layer data channel.

In one embodiment, the K1 piece(s) of first-type information is(are) transmitted on a downlink physical layer data channel, while the K2 piece(s) of first-type information is(are) transmitted on another downlink physical layer data channel.

In one embodiment, the downlink physical layer data channel is a Physical Downlink Shared CHannel (PDSCH).

In one embodiment, the downlink physical layer data channel is a short PDSCH (sPDSCH).

In one embodiment, the downlink physical layer data channel is a New Radio PDSCH (NR-PDSCH).

In one embodiment, the downlink physical layer data channel is a Narrow Band PDSCH (NB-PDSCH).

In one embodiment, the box F1 in FIG. 5 exists, and the box F2 in FIG. 5 does not exist.

In one embodiment, the box F2 in FIG. 5 exists, and the box F1 in FIG. 5 does not exist.

Embodiment 6

Figure 6:
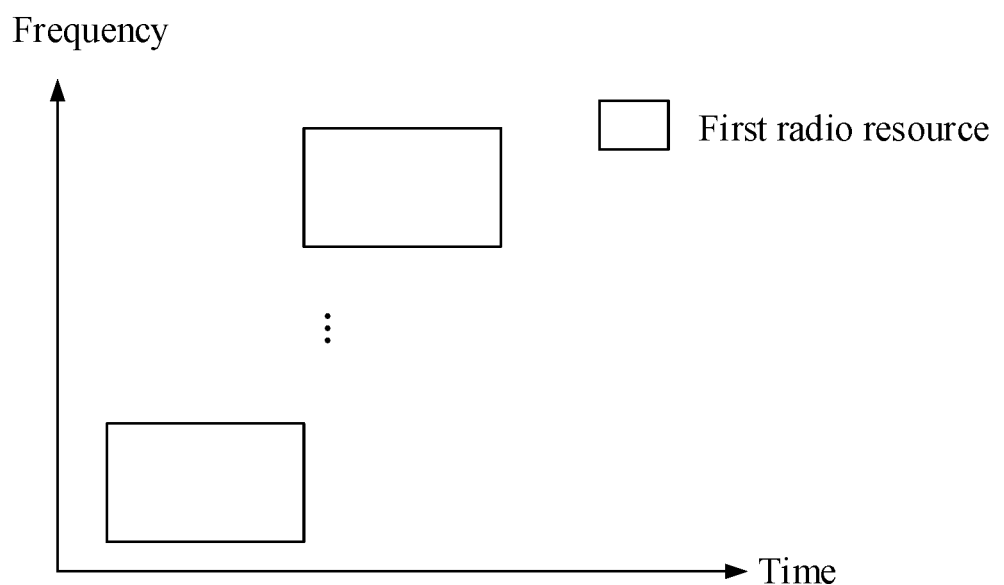
FIG. 6 illustrates a schematic diagram of resource mapping of a first radio resource onto time-frequency domain according to one embodiment of the present disclosure.

Embodiment 6 illustrates a schematic diagram of resource mapping of a first radio resource onto time-frequency domain; as shown in FIG. 6.

In Embodiment 6, the first radio resource belongs to the first resource set in the present disclosure, the first resource set being one of the K resource set(s) in the present disclosure, and any of the K resource set(s) comprises a positive integer number of radio resource(s), K being a positive integer.

In one embodiment, the first radio resource comprises a time-frequency resource and a code-domain resource.

In one embodiment, the first radio resource occupies a positive integer number of RE(s) in time-frequency domain.

In one embodiment, an RE occupies a multicarrier symbol in time domain, and a subcarrier in frequency domain.

In one embodiment, the first radio resource occupies a positive integer number of multicarrier symbol(s) in time domain.

In one embodiment, the first radio resource occupies a positive integer number of consecutive multicarrier symbols in time domain.

In one embodiment, the first radio resource occupies a positive integer number of non-consecutive multicarrier symbols in time domain.

In one embodiment, the first radio resource occupies a positive integer number of subcarrier(s) in frequency domain.

In one embodiment, the first radio resource occupies a positive integer number of non-consecutive subcarriers in frequency domain.

In one embodiment, the first radio resource is a PUCCH resource.

In one embodiment, the first radio resource is a PUCCH resource set.

In one embodiment, the first resource set is a PUCCH resource set.

In one embodiment, there are at least two radio resources in the first resource set being mapped onto a same time-frequency resource by different code-domain resources.

In one embodiment, any radio resource in the K resource set(s) comprises a time-frequency resource and a code-domain resource.

In one embodiment, any radio resource in the K resource set(s) occupies a positive integer number of RE(s) in time-frequency domain.

In one embodiment, any radio resource in the K resource set(s) occupies a positive integer number of multicarrier symbol(s) in time domain.

In one embodiment, at least one radio resource in the K resource set(s) occupies a positive integer number of consecutive multicarrier symbols in time domain.

In one embodiment, at least one radio resource in the K resource set(s) occupies a positive integer number of non-consecutive multicarrier symbols in time domain.

In one embodiment, any radio resource in the K resource set(s) occupies a positive integer number of subcarrier(s) in frequency domain.

In one embodiment, at least one radio resource in the K resource set(s) occupies a positive integer number of consecutive subcarriers in frequency domain.

In one embodiment, at least one radio resource in the K resource set(s) occupies a positive integer number of non-consecutive subcarriers in frequency domain.

In one embodiment, any radio resource in the K resource set(s) is a PUCCH resource.

In one embodiment, at least one radio resource in the K resource set(s) is a PUCCH resource set.

In one embodiment, there are at least two radio resources in the K resource set(s) being mapped onto a same time-frequency resource by different code-domain resources.

In one embodiment, any of the K resource set(s) is a PUCCH resource set.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the K is greater than 1, and there is at least one radio resource belonging to two resource sets of the K resource sets simultaneously.

In one embodiment, the K is greater than 1, and there is no radio resource belonging to two resource sets of the K resource sets simultaneously.

In one embodiment, at least one of the K resource set(s) comprises 1 radio resource.

In one embodiment, at least one of the K resource set(s) comprises more than 1 radio resource.

In one embodiment, the first resource set is one of the K resource set(s).

In one embodiment, any resource set of the K resource set(s) comprises no more than 8 radio resources.

In one embodiment, the K is greater than 1.

In one embodiment, the K is equal to 1.

In one embodiment, the K is no greater than 4.

In one embodiment, a number of radio resources comprised in the first resource set is greater than 1.

In one embodiment, a number of radio resource(s) comprised in the first resource set is equal to 1.

Embodiment 7

Figure 7:
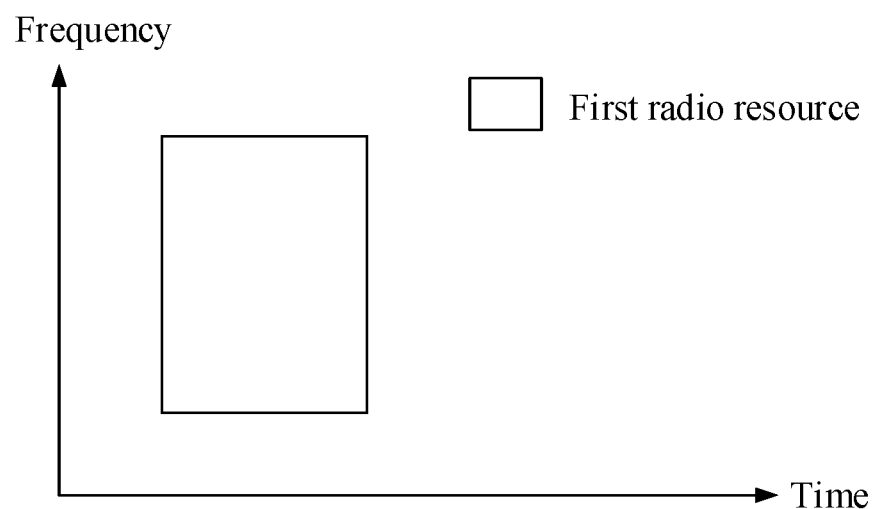
FIG. 7 illustrates a schematic diagram of resource mapping of a first radio resource onto time-frequency domain according to one embodiment of the present disclosure.

Embodiment 7 illustrates a schematic diagram of resource mapping of a first radio resource onto time-frequency domain; as shown in FIG. 7.

In Embodiment 7, the first radio resource belongs to the first resource set in the present disclosure. The first resource set is a resource set out of the K1 and the K2 resource sets in the present disclosure. The K1 and K2 are positive integers, respectively.

In one embodiment, the first radio resource occupies a positive integer number of consecutive subcarriers in frequency domain.

In one embodiment, any of the K1 resource set(s) comprises a positive integer number of radio resource(s).

In one embodiment, any of the K2 resource set(s) comprises a positive integer number of radio resource(s).

In one embodiment, any radio resource in the K1 resource set(s) comprises a time-frequency resource and a code-domain resource.

In one embodiment, any radio resource in the K2 resource set(s) comprises a time-frequency resource and a code-domain resource.

In one embodiment, any radio resource in the K1 resource set(s) is a PUCCH resource.

In one embodiment, any radio resource in the K2 resource set(s) is a PUCCH resource.

In one embodiment, any resource set of the K1 resource set(s) is a PUCCH resource set.

In one embodiment, any resource set of the K2 resource set(s) is a PUCCH resource set.

In one embodiment, the K1 is greater than 1.

In one embodiment, the K1 is equal to 1.

In one embodiment, the K2 is greater than 1.

In one embodiment, the K2 is equal to 1.

In one embodiment, the K1 is a positive integer no greater than 8.

In one embodiment, the K2 is a positive integer no greater than 8.

In one embodiment, the K1 is equal to the K2.

In one embodiment, the K1 is unequal to the K2.

In one embodiment, at least one of the K1 resource set(s) belongs to the K2 resource set(s).

In one embodiment, at least one radio resource in the K1 resource set(s) belongs to the K2 resource set(s).

In one embodiment, any of the K1 resource set(s) does not belong to the K2 resource set(s).

In one embodiment, any radio resource in the K1 resource set(s) does not belong to the K2 resource set(s).

In one embodiment, there are at least two radio resources in the K1 resource set(s) and the K2 resource set(s) being mapped onto a same time-frequency resource by different code-domain resources.

Embodiment 8

Figure 8:
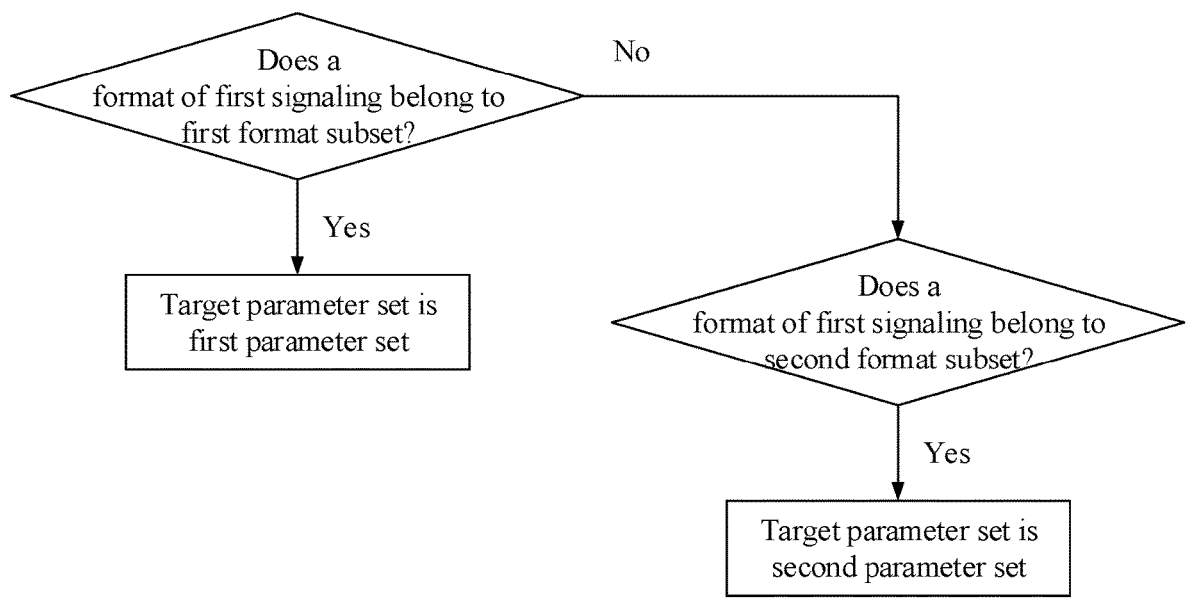
FIG. 8 illustrates a schematic diagram of a first signaling being used to determine a target parameter set according to one embodiment of the present disclosure.

Embodiment 8 illustrates a schematic diagram of a first signaling being used to determine a target parameter set; as shown in FIG. 8.

In Embodiment 8, the target parameter set is either the first parameter set in the present disclosure or the second parameter set in the present disclosure. A format of the first signaling is used to determine the target parameter set between the first parameter set and the second parameter set.

If the format of the first signaling belongs to a first format subset, the target parameter set is the first parameter set; if the format of the first signaling belongs to a second format subset, the target parameter set is the second parameter set. The first format subset and the second format subset respectively comprise a positive integer number of DCI format(s).

In one embodiment, the DCI formats include DCI format 00, DCI format 0_1, DCI format 10, DCI format 1_1 and compact DCI format.

In one embodiment, there is no DCI format belonging to the first format subset and the second format subset simultaneously.

In one embodiment, the first format subset comprises a DCI format 0_0 and a DCI format 0_1.

In one embodiment, the first format subset comprises a DCI format 1_0 and a DCI format 1_1.

In one embodiment, the second format subset comprises a compact DCI format.

In one embodiment, the specific meaning of DCI format 0_0, DCI format 0_1, DCI format 1_0 and DCI format 11 can be found in 3GPP TS38.212.

In one embodiment, the format of the first signaling belongs to either the first format subset or the second format subset.

Embodiment 9

Figure 9:
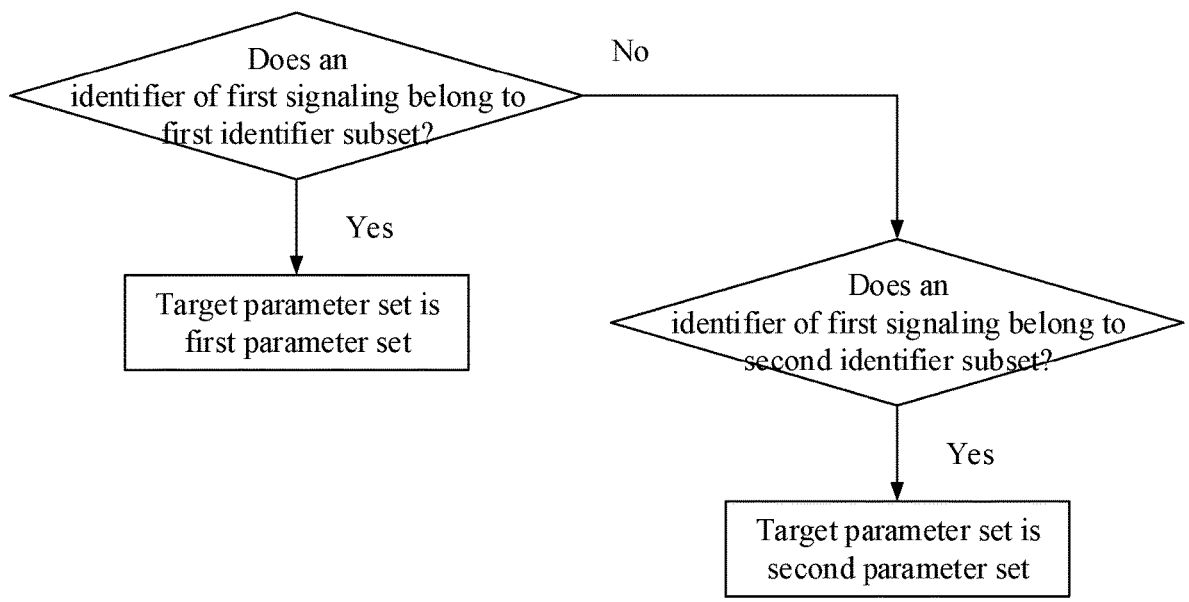
FIG. 9 illustrates a schematic diagram of a first signaling being used to determine a target parameter set according to one embodiment of the present disclosure.

Embodiment 9 illustrates a schematic diagram of a first signaling being used to determine a target parameter set; as shown in FIG. 9.

In Embodiment 9, the target parameter set is either the first parameter set in the present disclosure or the second parameter set in the present disclosure. An identifier of the first signaling is used to determine the target parameter set between the first parameter set and the second parameter set. If the identifier of the first signaling belongs to a first identifier subset, the target parameter set is the first parameter set; if the identifier of the first signaling belongs to a second identifier subset, the target parameter set is the second parameter set. The first identifier subset and the second identifier subset respectively comprise a positive integer number of identifier(s).

In one embodiment, the identifiers include a C-RNTI, a CS-RNTI and a new-RNTI.

In one embodiment, there is no identifier belonging to the first identifier subset and the second identifier subset simultaneously.

In one embodiment, the first identifier subset comprises a C-RNTI.

In one embodiment, the first identifier subset comprises a CS-RNTI.

In one embodiment, the second identifier subset comprises a new-RNTI.

In one embodiment, the second identifier subset comprises a CS-RNTI.

In one embodiment, an identifier of the first signaling belongs to either the first identifier subset or the second identifier subset.

Embodiment 10

Figure 10:
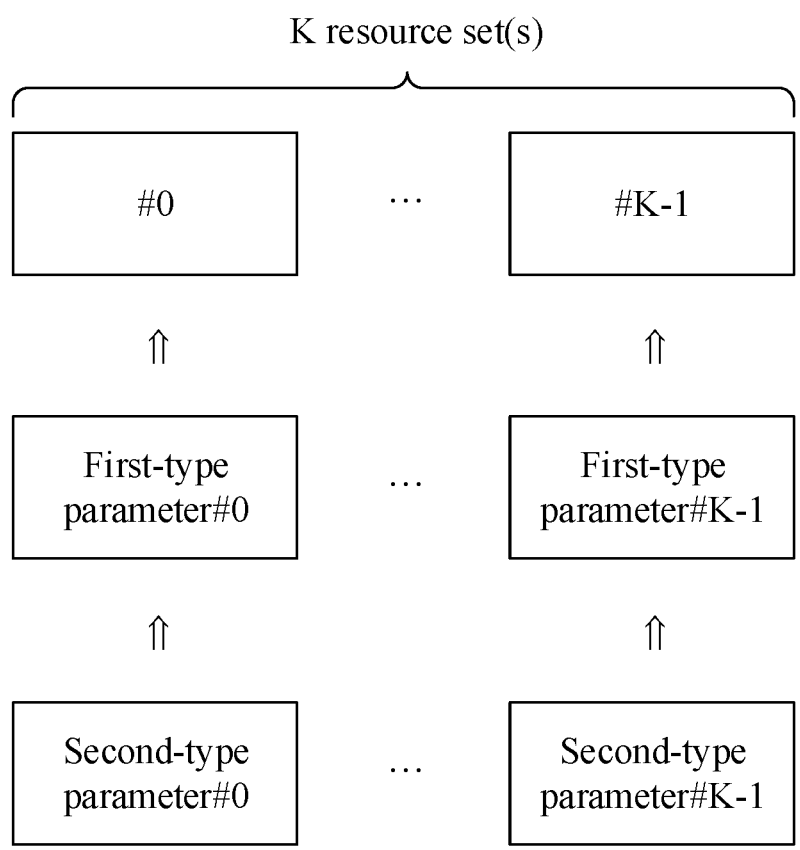
FIG. 10 illustrates a schematic diagram of relations among K first-type parameter(s), K second-type parameter(s) and K resource set(s) according to one embodiment of the present disclosure.

Embodiment 10 illustrates a schematic diagram of relations among K first-type parameter(s), K second-type parameter(s) and K resource set(s); as shown in FIG. 10.

In Embodiment 10, the first parameter set in the present disclosure comprises the K first-type parameter(s), while the second parameter set in the present disclosure comprises the K second-type parameter(s); the K first-type parameter(s) respectively corresponds(correspond) to the K resource set(s), and the K second-type parameter(s) respectively corresponds(correspond) to the K resource set(s). In FIG. 10, index(es) of the K resource set(s), the K first-type parameter(s) and the K second-type parameter(s) is(are) #0 . . . , and #K−1, respectively.

In one embodiment, any two first-type parameters in the first parameter set are unequal.

In one embodiment, any two second-type parameters in the second parameter set are unequal.

In one embodiment, there is at least one first-type parameter in the first parameter set equal to a second-type parameter in the second parameter set.

In one embodiment, any first-type parameter in the first parameter set is unequal to any second-type parameter in the second parameter set.

In one embodiment, any first-type parameter in the first parameter set is configured by a maxPayloadMinus1 field in a PUCCH-ResourceSet.

In one embodiment, any second-type parameter in the second parameter set is configured by a maxPayloadMinus1 field in a PUCCH-ResourceSet.

In one embodiment, at least one first-type parameter in the first parameter set is configured by a maxPayloadMinus1 field in a PUCCH-ResourceSet.

In one embodiment, at least one second-type parameter in the second parameter set is configured by a maxPayloadMinus1 field in a PUCCH-Resource Set.

In one embodiment, any first-type parameter in the first parameter set corresponds to a value of maxPayloadMinus1.

In one embodiment, any second-type parameter in the second parameter set corresponds to a value of maxPayloadMinus1.

In one embodiment, at least one first-type parameter in the first parameter set corresponds to a value of maxPayloadMinus1.

In one embodiment, at least one second-type parameter in the second parameter set corresponds to a value of maxPayloadMinus1.

In one embodiment, any first-type parameter in the first parameter set is pre-defined (i.e., there is no need for configuring).

In one embodiment, any second-type parameter in the second parameter set is pre-defined (i.e., there is no need for configuring).

In one embodiment, at least one first-type parameter in the first parameter set is pre-defined (i.e., there is no need for configuring).

In one embodiment, at least one second-type parameter in the second parameter set is pre-defined (i.e., there is no need for configuring).

In one embodiment, a first-type parameter in the first parameter set is equal to 2.

In one embodiment, a second-type parameter in the second parameter set is equal to 2.

In one embodiment, a first-type parameter in the first parameter set is equal to 1706.

In one embodiment, a second-type parameter in the second parameter set is equal to 1706.

In one embodiment, any first-type parameter in the first parameter set is a positive integer.

In one embodiment, any first-type parameter in the first parameter set is an integer no less than 2 and no greater than 1706.

In one embodiment, any second-type parameter in the second parameter set is a positive integer.

In one embodiment, any second-type parameter in the second parameter set is an integer no less than 2 and no greater than 1706.

In one embodiment, an i-th first-type parameter of the K first-type parameters is no less than an i-th second-type parameter of the K second-type parameters, i being any positive integer no greater than the K.

In one embodiment, the K first-type parameters are sequentially arranged in an ascending order.

In one embodiment, the K second-type parameters are sequentially arranged in an ascending order.

In one embodiment, the K resource sets are sequentially arranged according to an ascending order of corresponding first-type parameters.

In one embodiment, the K resource sets are sequentially arranged according to an ascending order of corresponding second-type parameters.

In one embodiment, any first-type parameter in the first parameter set corresponds to a value of PUCCH-MaxCodeRate.

In one embodiment, any second-type parameter in the second parameter set corresponds to a value of PUCCH-MaxCodeRate.

In one embodiment, any first-type parameter in the first parameter set is a positive real number.

In one embodiment, any first-type parameter in the first parameter set is one of 0.08, 0.15, 0.25, 0.35, 0.45, 0.6 and 0.8.

In one embodiment, any second-type parameter in the second parameter set is a positive real number.

In one embodiment, any second-type parameter in the second parameter set is one of 0.08, 0.15, 0.25, 0.35, 0.45, 0.6 and 0.8.

In one embodiment, the specific meaning of PUCCH-MaxCodeRate can be found in 3GPP TS38.331.

In one embodiment, any first-type parameter in the first parameter set corresponds to an MCS index.

In one embodiment, any second-type parameter in the second parameter set corresponds to an MCS index.

In one embodiment, the first parameter set is semi-statically configured.

In one embodiment, the second parameter set is semi-statically configured.

In one embodiment, the first parameter set is UE-specific.

In one embodiment, the second parameter set is UE-specific.

In one embodiment, the first parameter set is configured by an RRC signaling.

In one embodiment, the second parameter set is configured by an RRC signaling.

In one embodiment, the first parameter set is configured by a PUCCH-Config IE.

In one embodiment, the second parameter set is configured by a PUCCH-Config IE.

In one embodiment, the specific meaning of PUCCH-Config IE can be found in 3GPP TS38.331.

Embodiment 11

Figure 11:
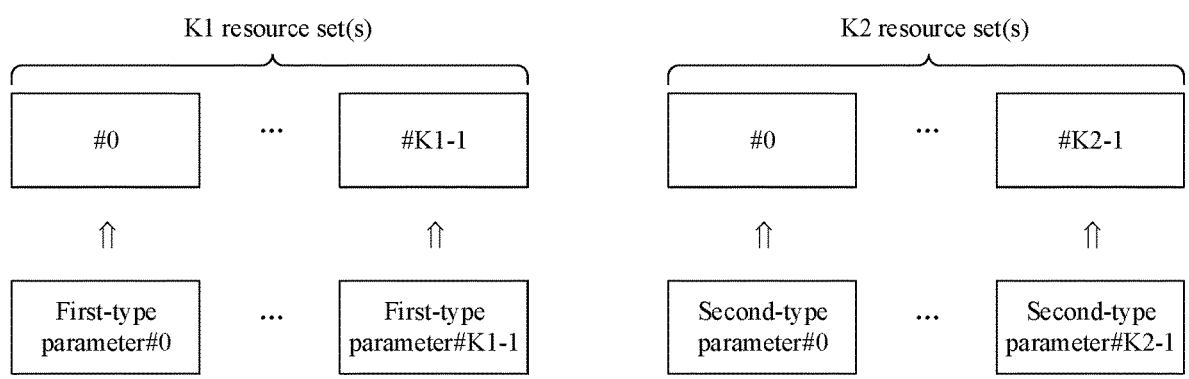
FIG. 11 illustrates a schematic diagram of relations among K1 first-type parameter(s), K2 second-type parameter(s), K1 resource set(s) and K2 resource set(s) according to one embodiment of the present disclosure.

Embodiment 11 illustrates a schematic diagram of relations among K1 first-type parameter(s), K2 second-type parameter(s), K1 resource set(s) and K2 resource set(s); as shown in FIG. 11.

In Embodiment 11, the first parameter set in the present disclosure comprises the K1 first-type parameter(s), while the second parameter set in the present disclosure comprises the K2 second-type parameter(s); the K1 first-type parameter(s) respectively corresponds(correspond) to K1 resource set(s), while the K2 second-type parameter(s) respectively corresponds(correspond) to K2 resource set(s). In FIG. 11, index(es) of the K1 first-type parameter(s) and the K1 resource set(s) is(are) #0 . . . , and #K1-1, respectively, and, index(es) of the K2 second-type parameter(s) and the K2 resource set(s) is(are) #0 . . . , and #K2-1, respectively.

In one embodiment, a j-th first-type parameter of the K1 first-type parameters is no less than a j-th second-type parameter of the K2 second-type parameters, j being any positive integer no greater than a smaller value between the K1 and K2.

In one embodiment, a maximum value of the K1 first-type parameters is no less than a maximum value of the K2 second-type parameters.

In one embodiment, the K1 first-type parameters are sequentially arranged in an ascending order.

In one embodiment, the K2 second-type parameters are sequentially arranged in an ascending order.

In one embodiment, the K1 resource sets are sequentially arranged according to an ascending order of corresponding first-type parameters.

In one embodiment, the K2 resource sets are sequentially arranged according to an ascending order of corresponding second-type parameters.

Embodiment 12

Figure 12:
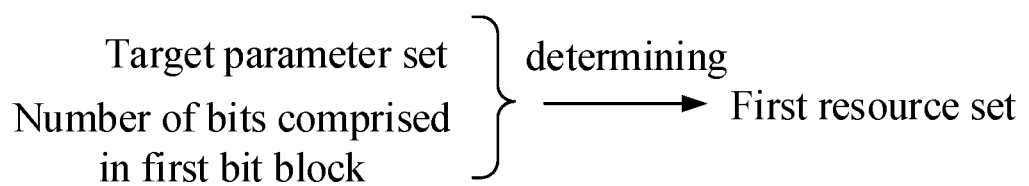
FIG. 12 illustrates a schematic diagram of a target parameter set being used to determine a first radio resource according to one embodiment of the present disclosure.

Embodiment 12 illustrates a schematic diagram of a target parameter set being used to determine a first radio resource; as shown in FIG. 12.

In Embodiment 12, the target parameter set is the first parameter set or the second parameter set in the present disclosure, the first radio resource is a radio resource in the first resource set in the present disclosure, and the first resource set is one of the K resource sets in the present disclosure. The target parameter set and a number of bits comprised in the first bit block in the present disclosure are jointly used to determine the first resource set out of the K resource sets.

In one embodiment, the target parameter set and a number of bits comprised in the first bit block are jointly used to determine the first radio resource.

In one embodiment, the target parameter set and a number of bits comprised in the first bit block are jointly used to determine the first resource set.

In one embodiment, a number of bits comprised in the first bit block is used to determine the first resource set.

In one embodiment, the target parameter set and a number of bits comprised in the first bit block are jointly used to determine the first resource set, and the first field of the first signaling in the present disclosure indicates the first radio resource out of the first resource set.

In one embodiment, for any given number of bits comprised in the first bit block, a number of REs comprised in the first radio resource when the target parameter set is the first parameter set is no greater than a number of REs comprised in the first radio resource when the target parameter set is the second parameter set.

In one embodiment, the target parameter set comprises K target parameters, the K target parameters respectively corresponding to the K resource sets; a first parameter is a minimum target parameter in the target parameter set no less than a number of bits comprised in the first bit block, and the first resource set is one of the K resource sets that corresponds to the first parameter.

In one subembodiment, the first parameter is a maximum payload size that the first radio resource can bear.

In one subembodiment, the first parameter is a maximum payload size that any radio resource comprised in the first resource set can bear.

In one subembodiment, any of the K target parameters is a maximum payload size that any radio resource comprised in a corresponding resource set can bear.

In one subembodiment, the first parameter is greater than a number of bits comprised in the first bit block.

In one subembodiment, the first parameter is equal to a number of bits comprised in the first bit block.

In one subembodiment, the K target parameters are positive integers, respectively.

In one subembodiment, any target parameter less than the first parameter out of the K target parameters is less than a number of bits comprised in the first bit block.

In one subembodiment, the K target parameters are arranged in an ascending order in the target parameter set.

In one subembodiment, the K resource sets are sequentially arranged according to an ascending order of corresponding target parameters.

Embodiment 13

Figure 13:
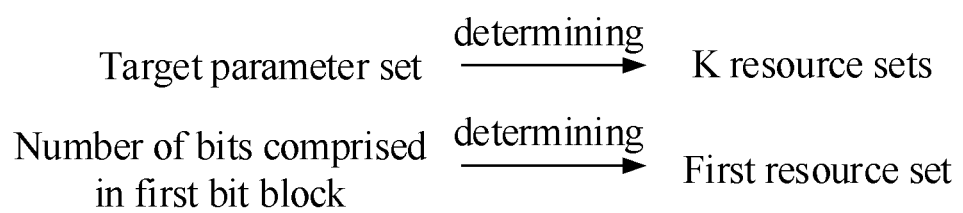
FIG. 13 illustrates a schematic diagram of a target parameter set being used to determine a first radio resource according to one embodiment of the present disclosure.

Embodiment 13 illustrates a schematic diagram of a target parameter set being used to determine a first radio resource; as shown in FIG. 13.

In Embodiment 13, the first radio resource belongs to the first resource set of the K resource sets in the present disclosure. The target parameter set is used to determine whether the K resource sets in the present disclosure are the K1 resource sets in the present disclosure or the K2 resource sets in the present disclosure. A number of bits comprised in the first bit block in the present disclosure is used to determine the first resource set out of the K resource sets.

In one embodiment, the target parameter set is used to determine the K resource sets, and a number of bits comprised in the first bit block is used to determine the first resource set out of the K resource sets.

In one embodiment, the target parameter set is used to determine the K resource sets, and the target parameter set and a number of bits comprised in the first bit block are jointly used to determine the first resource set out of the K resource sets.

In one embodiment, the first signaling in the present disclosure is used to determine whether the K resource set(s) is(are) the K1 resource set(s) or the K2 resource set(s).

In one embodiment, the first signaling in the present disclosure is used to determine whether the first resource set is one of the K1 resource set(s) or one of the K2 resource set(s).

In one embodiment, the format of the first signaling in the present disclosure is used to determine whether the K resource set(s) is(are) the K1 resource set(s) or the K2 resource set(s).

In one embodiment, the format of the first signaling in the present disclosure is used to determine whether the first resource set is one of the K1 resource set(s) or one of the K2 resource set(s).

In one embodiment, the format of the first signaling in the present disclosure is used to determine whether the K is equal to the K1 or the K2.

In one embodiment, the identifier of the first signaling in the present disclosure is used to determine whether the K resource set(s) is(are) the K1 resource set(s) or the K2 resource set(s).

In one embodiment, the identifier of the first signaling in the present disclosure is used to determine whether the first resource set is one of the K1 resource set(s) or one of the K2 resource set(s).

In one embodiment, the identifier of the first signaling in the present disclosure is used to determine whether the K is equal to the K1 or the K2.

Embodiment 14

Figure 14:
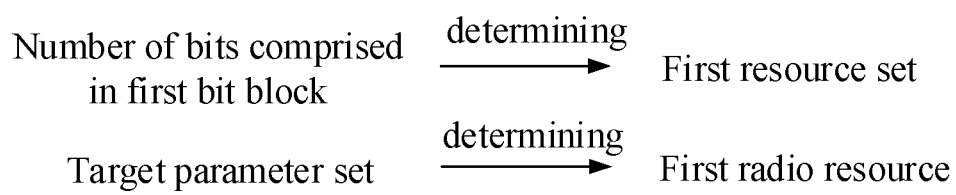
FIG. 14 illustrates a schematic diagram of a target parameter set being used to determine a first radio resource according to one embodiment of the present disclosure.

Embodiment 14 illustrates a schematic diagram of a target parameter set being used to determine a first radio resource; as shown in FIG. 14.

In Embodiment 14, the target parameter set is either the first parameter set in the present disclosure or the second parameter set in the present disclosure. The first radio resource belongs to the first resource set of the K resource sets in the present disclosure. A number of bits comprised in the first bit block in the present disclosure is used to determine the first resource set out of the K resource sets. The target parameter set is used to determine the first radio resource out of the first resource set.

In one embodiment, a number of bits comprised in the first bit block is used to determine the first resource set, and the target parameter set is used to determine the first radio resource out of the first resource set.

In one embodiment, any first-type parameter in the first parameter set corresponds to a PUCCH-ResourceId.

In one embodiment, any second-type parameter in the second parameter set corresponds to a PUCCH-ResourceId.

In one embodiment, the specific meaning of PUCCH-ResourceId can be found in 3GPP TS38.331.

In one embodiment, any first-type parameter in the first parameter set indicates a PUCCH resource.

In one embodiment, any second-type parameter in the second parameter set indicates a PUCCH resource.

In one embodiment, any two first-type parameters in the first parameter set indicate two different PUCCH resources in a PUCCH resource set.

In one embodiment, any two second-type parameters in the second parameter set indicate two different PUCCH resources in a PUCCH resource set.

In one embodiment, each first-type parameter in the first parameter set and each second-type parameter in the second parameter set indicate a PUCCH resource in a same PUCCH resource set.

In one embodiment, any first-type parameter in the first parameter set is a positive integer no greater than 8.

In one embodiment, any second-type parameter in the second parameter set is a positive integer no greater than 8.

In one embodiment, any first-type parameter in the first parameter set indicates a radio resource in the first resource set.

In one embodiment, any first-type parameter in the first parameter set indicates a PUCCH-ResourceId for a radio resource in the first resource set.

In one embodiment, any second-type parameter in the second parameter set indicates a radio resource in the first resource set.

In one embodiment, any second-type parameter in the second parameter set indicates a PUCCH-ResourceId for a radio resource in the first resource set.

In one embodiment, an index of the first radio resource in the first resource set is related to the target parameter set.

In one embodiment, the target parameter set is used to determine P3 radio resource(s) in the first resource set, the first radio resource being one of the P3 radio resource(s). P3 is a positive integer no greater than a number of radio resource(s) comprised in the first resource set.

In one subembodiment, the target parameter set comprises P3 target parameter(s), the P3 target parameter(s) respectively indicating the P3 radio resource(s).

In one subembodiment, the first field of the first signaling in the present disclosure indicates the first radio resource of the P3 radio resource(s).

In one subembodiment, the first field of the first signaling in the present disclosure indicates an index of the first radio resource in the P3 radio resource(s).

In one embodiment, if the target parameter set is the first parameter set, the first radio resource is one of P4 radio resource(s); if the target parameter set is the second parameter set, the first radio resource is one of P5 radio resource(s). The P4 radio resource(s) and the P5 radio resource(s) are two different subsets of all radio resources comprised by the first resource set; P4 and P5 are respectively positive integers no greater than a number of radio resources comprised in the first resource set.

In one subembodiment, any radio resource comprised by the first resource set is either one of the P4 radio resource(s) or one of the P5 radio resource(s).

In one subembodiment, at least one radio resource of the P4 radio resource(s) is not any one of the P5 radio resource(s).

In one subembodiment, at least one radio resource of the P5 radio resource(s) is not any one of the P4 radio resource(s).

In one subembodiment, the first parameter set comprises P4 first-type parameter(s), the P4 first-type parameter(s) respectively indicating the P4 radio resource(s).

In one subembodiment, the second parameter set comprises P5 second-type parameter(s), the P5 second-type parameter(s) respectively indicating the P5 radio resource(s).

In one subembodiment, there isn't any radio resource in the first resource set that belongs to the P4 radio resource(s) and the P5 radio resource(s) simultaneously.

In one subembodiment, there is at least one radio resource in the first resource set that belongs to the P4 radio resource(s) and the P5 radio resource(s) simultaneously.

In one subembodiment, a number of REs comprised by at least one radio resource of the P5 radio resource(s) is greater than that comprised by any radio resource of the P4 radio resource(s).

In one subembodiment, a number of REs comprised by an i-th radio resource of the P5 radio resources is no less than a number of REs comprised by an i-th radio resource of the P4 radio resources; i is any positive integer no greater than a smaller value between P4 and P5.

In one embodiment, the K resource sets respectively correspond to K candidate integers; a first candidate integer is a minimum one of the K candidate integers no less than a number of bits comprised in the first bit block, and the first resource set is one of the K resource sets that corresponds to the first candidate integer.

In one subembodiment, the K candidate integers are respectively configured by RRC signalings.

In one subembodiment, the K candidate integers are respectively positive integers.

In one subembodiment, the first candidate integer is a maximum payload size that the first radio resource can bear.

In one subembodiment, the first candidate integer is a maximum payload size that any radio resource comprised by the first resource set can bear.

In one subembodiment, any of the K candidate integer(s) is a maximum payload size that any radio resource comprised by a corresponding resource set can bear.

In one subembodiment, the K resource sets are sequentially arranged according to an ascending order of corresponding candidate integers.

In one embodiment, the UE in the present disclosure receives second-type sub-information, and the second-type sub-information is used to determine at least one of the first parameter set or the second parameter set.

In one subembodiment, the second-type sub-information indicates the first parameter set and the second parameter set.

In one subembodiment, one of the K pieces of first-type sub-information in the present disclosure that corresponds to the first resource set comprises the second-type sub-information.

In one subembodiment, if the first resource set is one of the K1 resource sets in the present disclosure, one of the K1 pieces of first-type sub-information in the present disclosure that corresponds to the first resource set comprises the second-type sub-information; if the first resource set is one of the K2 resource sets in the present disclosure, one of the K2 pieces of first-type sub-information in the present disclosure that corresponds to the first resource set comprises the second-type sub-information.

Embodiment 15

Embodiment 15 illustrates a schematic diagram of one of K piece(s) of first-type information; as shown in FIG. 15.

In Embodiment 15, the K piece(s) of first-type information respectively indicates(indicate) the K resource set(s) in the present disclosure. First information is a piece of first-type information of the K piece(s) of first-type information, and the first information indicates a second resource set of the K resource set(s), and the second resource set comprises P1 radio resource(s), P1 being a positive integer. The first information comprises first sub-information and second sub-information. The first sub-information indicates an index of the second resource set, while the second sub-information indicates the P1 radio resource(s).

In one embodiment, an index of the second resource set is a PUCCH-ResourceSetId.

In one embodiment, the first information is indicated by a PUCCH-ResourceSet IE, and the first sub-information is indicated by a pucch-ResourceSetId field of the PUCCH-ResourceSet IE.

In one embodiment, the specific meaning of pucch-ResourceSetId field can be found in 3GPP TS38.331.

In one embodiment, the specific meaning of PUCCH-ResourceSetId can be found in 3GPP TS38.331.

In one embodiment, the second sub-information indicates an index of each radio resource of the P1 radio resource(s).

In one embodiment, the second sub-information indicates a PUCCH-ResourceId corresponding to each radio resource of the P1 radio resource(s).

In one embodiment, the first information is indicated by a PUCCH-ResourceSet IE, and the second sub-information is indicated by a resourceList field of the PUCCH-Resource Set IE.

In one embodiment, the first information comprises third sub-information, the third sub-information indicating one of the K first-type parameter(s) in the present disclosure that corresponds to the second resource set.

In one subembodiment, the first information is indicated by a PUCCH-Resource Set IE, and the third sub-information is indicated by a maxPayloadMinus1 field of the PUCCH-ResourceSet IE.

In one subembodiment, the third sub-information is one of the J1 piece(s) of first-type sub-information in the present disclosure.

In one embodiment, the first information comprises fourth sub-information, the fourth sub-information indicating one of the K second-type parameter(s) in the present disclosure that corresponds to the second resource set.

In one subembodiment, the first information is indicated by a PUCCH-Resource Set IE, and the fourth sub-information is indicated by a maxPayloadMinus1 field of the PUCCH-ResourceSet IE.

In one subembodiment, the fourth sub-information is one of the J2 piece(s) of first-type sub-information in the present disclosure.

In one embodiment, the K piece(s) of first-type information is(are) respectively carried by higher layer signaling(s).

In one embodiment, the K piece(s) of first-type information is(are) respectively carried by RRC signaling(s).

In one embodiment, the K piece(s) of first-type information is(are) respectively carried by K RRC signaling(s).

In one embodiment, the K piece(s) of first-type information is(are) carried by an RRC signaling.

In one embodiment, the K piece(s) of first-type information is(are) respectively UE-specific.

In one embodiment, the K piece(s) of first-type information is(are) respectively semi-statically configured.

In one embodiment, any one of the K piece(s) of first-type information comprises part of or all information in a resourceSetToAddModList field of a PUCCH-Config IE.

In one embodiment, a resourceSetToAddModList field of a PUCCH-Config IE indicates the K piece(s) of first-type information.

In one embodiment, a resourceSetToAddModList field of a same PUCCH-Config IE indicates the K piece(s) of first-type information.

In one embodiment, any one of the K piece(s) of first-type information comprises part of or all information in a PUCCH-ResourceSet.

In one embodiment, the K piece(s) of first-type information is(are) respectively indicated by K PUCCH-ResourceSet IE(s).

In one embodiment, the specific meaning of resourceSet-ToAddModList can be found in 3GPP TS38.331.

In one embodiment, transmitting power of the first radio signal in the present disclosure is linear with a first component, and a linear coefficient between the transmitting power of the first radio signal and the first component is equal to 1. One of the K piece(s) of first-type information corresponding to the first resource set in the present disclosure indicates a first candidate component and a second candidate component. If the target parameter set in the present disclosure is the first parameter set in the present disclosure, the first component is the first candidate component; if the target parameter set is the second parameter set in the present disclosure, the first component is the second candidate component.

In one subembodiment, the first component is $P_{0\_PUSCH,b,f,c}(j)$, and the $P_{0\_PUSCH,b,f,c}$ is a Physical Uplink Shared CHannel (PUSCH) power base related to parameter configuration indexed by j on a Bandwidth Part (BWP) indexed by b on a carrier indexed by f of a serving cell indexed by c, and the first radio signal is transmitted on the BWP indexed by b on the carrier indexed by f of the serving cell indexed by c. The specific meaning of the $P_{0\_PUSCH,b,f,c}(j)$ can be found in 3GPP TS38.213.

In one subembodiment, the first component is $P_{0\_NOMINAL\_PUSCH,f,c}(j)$ and the $P_{0\_NOMINAL\_PUSCH,f,c}(j)$ is a PUSCH power base component related to parameter configuration indexed by j on a carrier indexed by f of a serving cell indexed by c, and the first radio signal is transmitted on the carrier indexed by f of the serving cell indexed by c. The specific meaning of the $P_{0\_NOMINAL\_PUSCH,f,c}(j)$ can be found in TS38.213.

In one subembodiment, the first component is $P_{0\_UE\_PUSCH,b,f,c}(j)$ is a $P_{0\_UE\_PUSCH,b,f,c}(j)$, and the P PUSCH power base component related to parameter configuration indexed by j on a BWP indexed by b on a carrier indexed by f of a serving cell indexed by c, and the first radio signal is transmitted on the BWP indexed by b on the carrier indexed by f of the serving cell indexed by c. The specific meaning of the $P_{0\_UE\_PUSCH,b,f,c}(j)$ can be found in TS38.213.

In one embodiment, transmitting power of the first radio signal in the present disclosure is linear with a third component, and a linear coefficient between the transmitting power of the first radio signal and the third component is a non-negative real number no greater than 1, a measurement on a first reference signal being used for determining the third component. One of the K piece(s) of first-type information corresponding to the first resource set in the present disclosure indicates a first candidate reference signal and a second candidate reference signal. If the target parameter set in the present disclosure is the first parameter set in the present disclosure, the first reference signal is the first candidate reference signal; if the target parameter set in the present disclosure is the second parameter set in the present disclosure, the first reference signal is the second candidate reference signal.

In one subembodiment, the third component is $PL_{b,f,c}(q_d)$, and the $PL_{b,f,c}(q_d)$ is an estimated value of pathloss measured by dB obtained according to a reference signal resource indexed by $q_d$ on a BWP indexed by b on a carrier indexed by f of a serving cell indexed by c, and the first radio signal is transmitted on the BWP indexed by b on the carrier indexed by f of the serving cell indexed by c. The specific meaning of the $PL_{b,f,c}(q_d)$ can be found in TS38.213.

In one subembodiment, the first reference signal comprises Channel-State Information Reference Signals (CSI-RS).

In one subembodiment, the first reference signal comprises a Synchronization Signal/Physical Broadcast Channel block (SS/PBCH block).

In one embodiment, a measurement on a second reference signal is used to determine an antenna port for transmitting the first radio signal in the present disclosure. One of the K piece(s) of first-type information corresponding to the first resource set in the present disclosure indicates a third candidate reference signal and a fourth candidate reference signal. If the target parameter set in the present disclosure is the first parameter set in the present disclosure, the second reference signal is the third candidate reference signal; if the target parameter set in the present disclosure is the second parameter set in the present disclosure, the second reference signal is the fourth candidate reference signal.

In one subembodiment, the measurement on the second reference signal is used to determine at least one of a spatial domain transmission filter or a precoding matrix corresponding to the first radio signal.

In one subembodiment, the second reference signal comprises CSI-RS.

In one subembodiment, the second reference signal comprises an SS/PBCH block.

In one embodiment, J1 piece(s) of first-type information of the K piece(s) of first-type information respectively comprises(comprise) the J1 piece(s) of first-type sub-information in the present disclosure, J1 being no greater than K.

In one embodiment, J2 piece(s) of first-type information of the K piece(s) of first-type information respectively comprises(comprise) the J2 piece(s) of first-type sub-information in the present disclosure, J2 being no greater than K.

Embodiment 16

Embodiment 16 illustrates a schematic diagram of a piece of first-type information of K1 piece(s) of and K2 piece(s) of first-type information; as shown in FIG. 16.

In Embodiment 16, the K1 piece(s) of first-type information respectively indicates(indicate) the K1 resource set(s) in the present disclosure, while the K2 piece(s) of first-type information respectively indicates(indicate) the K2 resource set(s) in the present disclosure. Second information is a piece of first-type information of the K1 and K2 pieces of first-type information, and the second information indicates a third resource set of the K1 and K2 resource sets; the third resource set comprises P2 radio resource(s), P2 being a positive integer. The second information comprises fifth sub-information and sixth sub-information. The fifth sub-information indicates an index of the third resource set, while the sixth sub-information indicates the P2 radio resource(s).

In one embodiment, an index of the third resource set is a PUCCH-ResourceSetId.

In one embodiment, the second information is indicated by a PUCCH-Resource Set IE, and the fifth sub-information is indicated by a pucch-ResourceSetId field of the PUCCH-ResourceSet IE.

In one embodiment, the sixth sub-information indicates an index of each radio resource of the P2 radio resource(s).

In one embodiment, the sixth sub-information indicates a PUCCH-ResourceId corresponding to each radio resource of the P2 radio resource(s).

In one embodiment, the second information is indicated by a PUCCH-Resource Set IE, and the sixth sub-information is indicated by a resourceList field of the PUCCH-Resource Set IE.

In one embodiment, the second information comprises seventh sub-information; if the third resource set is one of the K1 resource set(s), the seventh sub-information indicates a first-type parameter of the K1 first-type parameter(s) in the present disclosure corresponding to the third resource set; if the third resource set is one of the K2 resource set(s), the seventh sub-information indicates a second-type parameter of the K2 second-type parameter(s) in the present disclosure corresponding to the third resource set.

In one subembodiment, the second information is indicated by a PUCCH-ResourceSet IE, and the seventh sub-information is indicated by a maxPayloadMinus1 field of the PUCCH-ResourceSet IE.

In one subembodiment, if the third resource set is one of the K1 resource set(s), the seventh sub-information is one of the J1 piece(s) of first-type sub-information in the present disclosure; if the third resource set is one of the K2 resource set(s), the seventh sub-information is one of the J2 piece(s) of first-type sub-information in the present disclosure.

In one embodiment, the K1 piece(s) of first-type information and the K2 piece(s) of first-type information are respectively carried by higher layer signalings.

In one embodiment, the K1 piece(s) of first-type information and the K2 piece(s) of first-type information are respectively carried by RRC signalings.

In one embodiment, the K1 piece(s) of first-type information is(are) respectively carried by K1 RRC signaling(s).

In one embodiment, the K2 piece(s) of first-type information is(are) respectively carried by K2 RRC signaling(s).

In one embodiment, the K1 piece(s) of first-type information is(are) carried by a same RRC signaling.

In one embodiment, the K2 piece(s) of first-type information is(are) carried by a same RRC signaling.

In one embodiment, the K1 piece(s) of first-type information and the K2 piece(s) of first-type information are carried by a same RRC signaling.

In one embodiment, the K1 piece(s) of first-type information and the K2 piece(s) of first-type information are respectively UE-specific.

In one embodiment, the K1 piece(s) of first-type information and the K2 piece(s) of first-type information are respectively semi-statically configured.

In one embodiment, any of the K1 piece(s) of first-type information comprises part of or all information in a resourceSetToAddModList field of a PUCCH-Config IE.

In one embodiment, any of the K2 piece(s) of first-type information comprises part of or all information in a resourceSetToAddModList field of a PUCCH-Config IE.

In one embodiment, resourceSetToAddModList field(s) of PUCCH-Config IE(s) respectively indicates(indicate) the K1 piece(s) of first-type information.

In one embodiment, a resourceSetToAddModList field of a same PUCCH-Config IE indicates the K1 piece(s) of first-type information.

In one embodiment, resourceSetToAddModList field(s) of PUCCH-Config IE(s) respectively indicates(indicate) the K2 piece(s) of first-type information.

In one embodiment, a resourceSetToAddModList field of a same PUCCH-Config IE indicates the K2 piece(s) of first-type information.

In one embodiment, resourceSetToAddModList fields of PUCCH-Config IEs respectively indicate the K1 piece(s) of first-type information and the K2 piece(s) of first-type information.

In one embodiment, a resourceSetToAddModList field of a same PUCCH-Config IE indicates the K1 piece(s) of first-type information and the K2 piece(s) of first-type information.

In one embodiment, any of the K1 piece(s) of first-type information comprises part of or all information in a PUCCH-ResourceSet.

In one embodiment, any of the K2 piece(s) of first-type information comprises part of or all information in a PUCCH-ResourceSet.

In one embodiment, the K1 piece(s) of first-type information is(are) respectively indicated by K1 PUCCH-ResourceSet IE(s).

In one embodiment, the K2 piece(s) of first-type information is(are) respectively indicated by K2 PUCCH-ResourceSet IE(s).

In one embodiment, at least one piece of first-type information of the K1 piece(s) of first-type information is one of the K2 piece(s) of first-type information.

In one embodiment, transmitting power of the first radio signal in the present disclosure is linear with a first component, and a linear coefficient between the transmitting power of the first radio signal and the first component is equal to 1; if the target parameter set in the present disclosure is the first parameter set in the present disclosure, the first component is indicated by one of the K1 piece(s) of first-type information corresponding to the first resource set in the present disclosure; if the target parameter set in the present disclosure is the second parameter set in the present disclosure, the first component is indicated by one of the K2 piece(s) of first-type information corresponding to the first resource set in the present disclosure.

In one subembodiment, the first component is $P_{0\_PUSCH,b,f,c}(j)$, and the specific meaning of the $P_{0\_PUSCH,b,f,c}(j)$ can be found in 3GPP TS38.213.

In one subembodiment, the first component is $P_{0\_NOMINAL\_PUSCH,f,c}(j)$, and the specific meaning of the $P_{0\_NOMINAL\_PUSCH,f,c}(j)$ can be found in TS38.213.

In one subembodiment, the first component is $P_{0\_UE\_PUSCH,b,f,c}(j)$ and the specific meaning of the $P_{0\_UE\_PUSCH,b,f,c}(j)$ can be found in TS38.213.

In one subembodiment, the first component is indicated by a spatialRelationInfoToAddModList field of a PUCCH-Config IE.

In one subembodiment, the first component is indicated by a p0-PUCCH-Id field of PUCCH-SpatialRelationInfo.

In one subembodiment, the first component is indicated by a pucch-PowerControl field of a PUCCH-Config IE.

In one embodiment, the specific meaning of spatialRelationInfoToAddModList field can be found in 3GPP TS38.331.

In one embodiment, the specific meaning of PUCCH-SpatialRelationInfo can be found in 3GPP TS38.331.

In one embodiment, the specific meaning of p0-PUCCH-Id field can be found in 3GPP TS38.331.

In one embodiment, the specific meaning of pucch-PowerControl field can be found in 3GPP TS38.331.

In one embodiment, transmitting power of the first radio signal in the present disclosure is linear with a third component, and a linear coefficient between the transmitting power of the first radio signal and the third component is a non-negative real number no greater than 1, a measurement on a first reference signal being used for determining the third component; if the target parameter set in the present disclosure is the first parameter set in the present disclosure, the first reference signal is indicated by one of the K1 piece(s) of first-type information corresponding to the first resource set in the present disclosure; if the target parameter set in the present disclosure is the second parameter set in the present disclosure, the first reference signal is indicated by one of the K2 piece(s) of first-type information corresponding to the first resource set in the present disclosure.

In one subembodiment, the third component is $PL_{b,f,c}(q_d)$, and the specific meaning of the $PL_{b,f,c}(q_d)$ can be found in TS38.213.

In one subembodiment, the first reference signal comprises CSI-RS.

In one subembodiment, the first reference signal comprises an SS/PBCH block.

In one subembodiment, the first reference signal is indicated by a spatialRelationInfoToAddModList field of a PUCCH-Config IE.

In one subembodiment, the first reference signal is indicated by a pucch-PathlossReferenceRS-Id field of PUCCH-SpatialRelationInfo.

In one subembodiment, the specific meaning of the pucch-PathlossReferenceRS-Id field can be found in 3GPP TS38.331.

In one embodiment, a measurement on a second reference signal is used to determine an antenna port for transmitting the first radio signal in the present disclosure; if the target parameter set in the present disclosure is the first parameter set in the present disclosure, the second reference signal is indicated by one of the K1 piece(s) of first-type information corresponding to the first resource set in the present disclosure; if the target parameter set in the present disclosure is the second parameter set in the present disclosure, the second reference signal is indicated by one of the K2 piece(s) of first-type information corresponding to the first resource set in the present disclosure.

In one subembodiment, the measurement on the second reference signal is used to determine at least one of a spatial domain transmission filter or a precoding matrix corresponding to the first radio signal.

In one subembodiment, the second reference signal comprises CSI-RS.

In one subembodiment, the second reference signal comprises an SS/PBCH block.

In one subembodiment, the second reference signal is indicated by a spatialRelationInfoToAddModList field of a PUCCH-Config IE.

In one subembodiment, the second reference signal is indicated by a referenceSignal field of PUCCH-SpatialRelationInfo.

In one embodiment, the specific meaning of the referenceSignal field can be found in 3GPP TS38.331.

In one embodiment, J1 piece(s) of first-type information of the K1 piece(s) of first-type information respectively comprises(comprise) the J1 piece(s) of first-type sub-information in the present disclosure, J1 being no greater than K1.

In one embodiment, J2 piece(s) of first-type information of the K2 piece(s) of first-type information respectively comprises(comprise) the J2 piece(s) of first-type sub-information in the present disclosure, J2 being no greater than K2.

Embodiment 17

Figure 17:
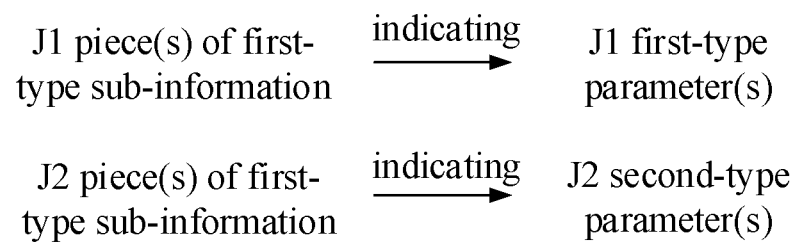
FIG. 17 illustrates a schematic diagram of relations among J1 piece(s) of first-type sub-information, J1 first-type parameter(s), J2 piece(s) of first-type sub-information and J2 second-type parameter(s) according to one embodiment of the present disclosure.

Embodiment 17 illustrates a schematic diagram of relations among J1 piece(s) of first-type sub-information, J1 first-type parameter(s), J2 piece(s) of first-type sub-information and J2 second-type parameter(s); as shown in FIG. 17.

In Embodiment 17, the J1 piece(s) of first-type sub-information respectively indicates(indicate) J1 first-type parameter(s), and the J2 piece(s) of first-type sub-information respectively indicates(indicate) J2 second-type parameter(s). Each of the J1 first-type parameter(s) belongs to the first parameter set in the present disclosure, and each of the J2 second-type parameter(s) belongs to the second parameter set in the present disclosure.

In one embodiment, the J1 is less than a number of first-type parameters comprised in the first parameter set.

In one embodiment, the J2 is less than a number of second-type parameters comprised in the second parameter set.

In one embodiment, the J1 is equal to a number of first-type parameters comprised in the first parameter set.

In one embodiment, the J2 is equal to a number of second-type parameters comprised in the second parameter set.

In one embodiment, the J1 piece(s) of first-type sub-information is(are) indicated by a resourceSetToAddModList field of a PUCCH-Config IE.

In one embodiment, the J2 piece(s) of first-type sub-information is(are) indicated by a resourceSetToAddModList field of a PUCCH-Config IE.

In one embodiment, the J1 piece(s) of first-type sub-information is(are) indicated by a maxPayloadMinus1 field of a PUCCH-Resource Set IE.

In one embodiment, the J2 piece(s) of first-type sub-information is(are) indicated by a maxPayloadMinus1 field of a PUCCH-Resource Set IE.

In one embodiment, the J1 piece(s) of first-type sub-information is(are) respectively indicated by maxPayloadMinus1 field(s) comprised in J1 PUCCH-ResourceSet IE(s).

In one embodiment, the J2 piece(s) of first-type sub-information is(are) respectively indicated by maxPayloadMinus1 field(s) comprised in J2 PUCCH-ResourceSet IE(s).

In one embodiment, the J1 is equal to the J2.

In one embodiment, the J1 is unequal to the J2.

Embodiment 18

Figure 18:
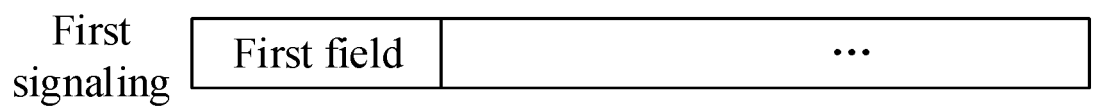
FIG. 18 illustrates a schematic diagram of a first signaling according to one embodiment of the present disclosure.

Embodiment 18 illustrates a schematic diagram of a first signaling; as shown in FIG. 18.

In Embodiment 18, the first signaling comprises a first field, and the first field of the first signaling indicates the first radio resource in the present disclosure out of the first resource set in the present disclosure.

In one embodiment, the first field of the first signaling indicates an index of the first radio resource in the first resource set.

In one embodiment, the first signaling is a physical layer signaling.

In one embodiment, the first signaling is a dynamic signaling.

In one embodiment, the first signaling is a dynamic signaling used for DownLink Grant.

In one embodiment, the first signaling is a dynamic signaling used for UpLink Grant.

In one embodiment, the first signaling comprises Downlink Control Information (DCI).

In one embodiment, the first signaling is UE-specific.

In one embodiment, the first signaling comprises DCI identified by a C-RNTI.

In one embodiment, the first signaling comprises DCI identified by a CS-RNTI.

In one embodiment, the first signaling comprises DCI identified by a new-RNTI.

In one embodiment, the first field of the first signaling comprises part of or all information in a PUCCH resource indicator field.

In one embodiment, the first field of the first signaling is a PUCCH resource indicator field.

In one embodiment, the first field of the first signaling is composed of 3 bits.

In one embodiment, the specific meaning of the PUCCH resource indicator field can be found in 3GPP TS38.212.

Embodiment 19

Embodiment 19 illustrates a schematic diagram of relations among a first signaling, a second radio signal and a first radio signal; as shown in FIG. 19.

In Embodiment 19, the first signaling is used to determine configuration information of the second radio signal, the first radio signal being a feedback on the second radio signal.

In one embodiment, the first signaling indicates configuration information of the second radio signal.

In one embodiment, the first signaling explicitly indicates configuration information of the second radio signal.

In one embodiment, the first signaling implicitly indicates configuration information of the second radio signal.

In one embodiment, the second radio signal comprises downlink data, and the first radio signal indicates whether the second radio signal is correctly received.

In one subembodiment, the second radio signal is transmitted on a PDSCH.

In one embodiment, the second radio signal comprises downlink data, and the first radio signal comprises HARQ-ACK.

In one embodiment, the second radio signal comprises a downlink reference signal, and the first radio signal comprises CSI generated by a measurement on the second radio signal.

In one subembodiment, the first signaling is a dynamic signaling used for Uplink Grant.

In one subembodiment, the downlink reference signal comprises CSI-RS.

In one subembodiment, the downlink reference signal comprises an SS/PBCH block.

In one embodiment, the second radio signal is transmitted on a downlink physical layer data channel (i.e., a downlink channel capable of carrying physical layer data), and the configuration information of the second radio signal refers to scheduling information of the second radio signal.

In one embodiment, the scheduling information of the second radio signal comprises at least one of time-domain resources occupied, frequency-domain resources occupied, an MCS, configuration information of DeModulation Reference Signals (DMRS), a HARQ process number, a Redundancy Version (RV), a New Data Indicator (NDI), corresponding Spatial Tx parameters or corresponding Spatial Rx parameters.

In one embodiment, the configuration information of DMRS comprises one or more of time-domain resources occupied, frequency-domain resources occupied, code-domain resources occupied, an RS sequence, a mapping mode, a DMRS type, a cyclic shift, or an OCC.

In one embodiment, the second radio signal is a downlink reference signal, and configuration information of the second radio signal comprises one or more of time-domain resources occupied, frequency-domain resources occupied, code-domain resources occupied, an RS sequence, a mapping mode, a cyclic shift or an OCC.

In one embodiment, the first radio signal comprises CSI, and configuration information of the first radio signal is one of TO piece(s) of configuration information, the first signaling indicating the configuration information of the first radio signal out of the TO piece(s) of configuration information, TO being a positive integer.

In one subembodiment, the configuration information of the first radio signal comprises one or more of reference signal resources used for channel estimation, reference signal resources used for interference estimation or CSI content, of which the CSI content comprises one or more of an RI, a CRI, a PMI, an RSRP, an RSRQ or a CQI.

In one subembodiment, the configuration information of the first radio signal indicates the second reference signal.

In one subembodiment, the TO piece(s) of configuration information is(are) configured by an RRC signaling.

In one subembodiment, the TO piece(s) of configuration information is(are) configured by a CSI-AperiodicTriggerStateList IE. The specific meaning of the CSI-AperiodicTriggerStateList IE can be found in 3GPP TS38.331.

Embodiment 20

Figure 20:
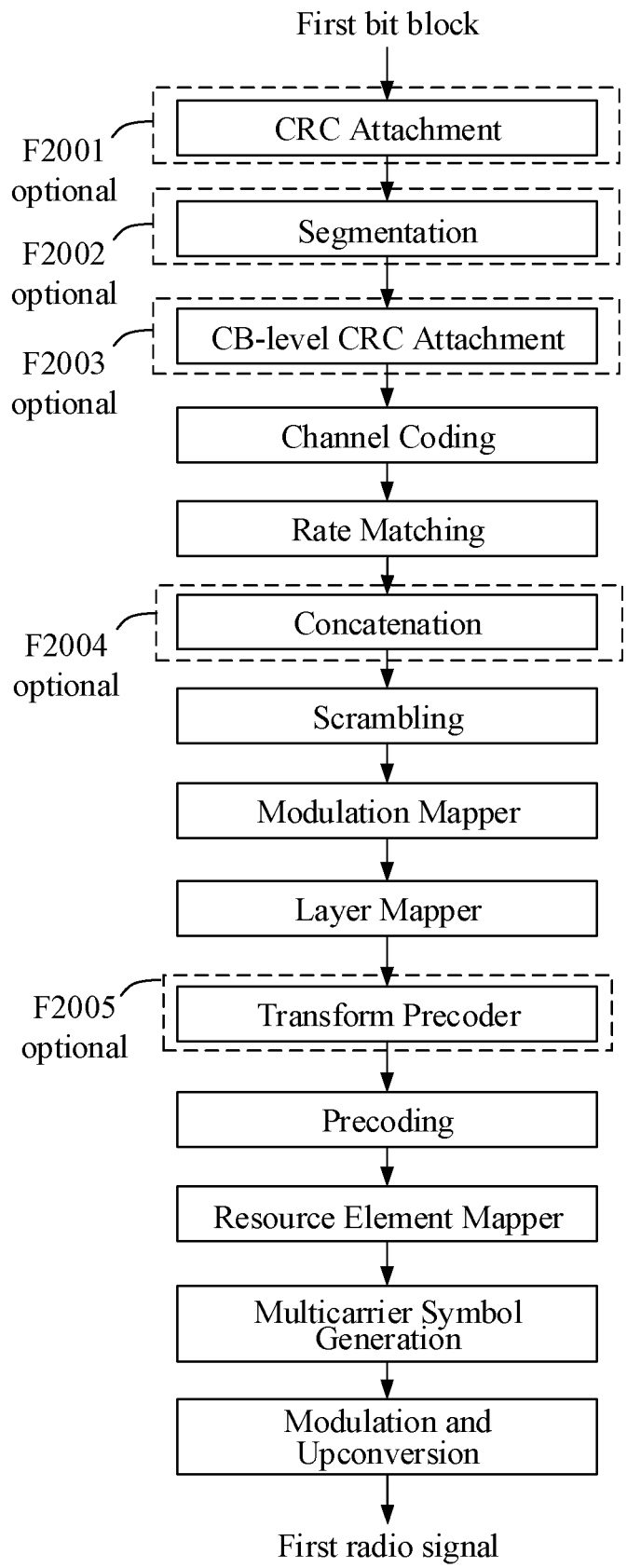
FIG. 20 illustrates a schematic diagram of a first radio signal carrying a first bit block according to one embodiment of the present disclosure.

Embodiment 20 illustrates a schematic diagram of a first radio signal carrying a first bit block; as shown in FIG. 20.

In Embodiment 20, the first radio signal is an output by all or part of bits in the first bit block sequentially through part or all of Cyclic Redundancy Check (CRC) Attachment, Segmentation, CB-level CRC Attachment, Channel Coding, Rate Matching, Concatenation, Scrambling, a Modulation Mapper, a Layer Mapper, a transform precoder (used for generating complex-value signals), Precoding, a Resource Element Mapper, and Multicarrier Symbol Generation as well as Modulation and Upconversion. In FIG. 20, boxes F2001-F2005 are optional, respectively.

In one embodiment, the first bit block comprises a positive integer number of bit(s).

In one embodiment, the first bit block carries UCI.

In one embodiment, the first bit block carries HARQ-ACK.

In one embodiment, the first bit block carries an SR.

In one embodiment, the first bit block carries CSI.

In one embodiment, a number of bits comprised in the first bit block is a payload size of UCI carried by the first radio signal.

In one embodiment, the first bit block is used to generate the first radio signal.

Embodiment 21

Figure 21:
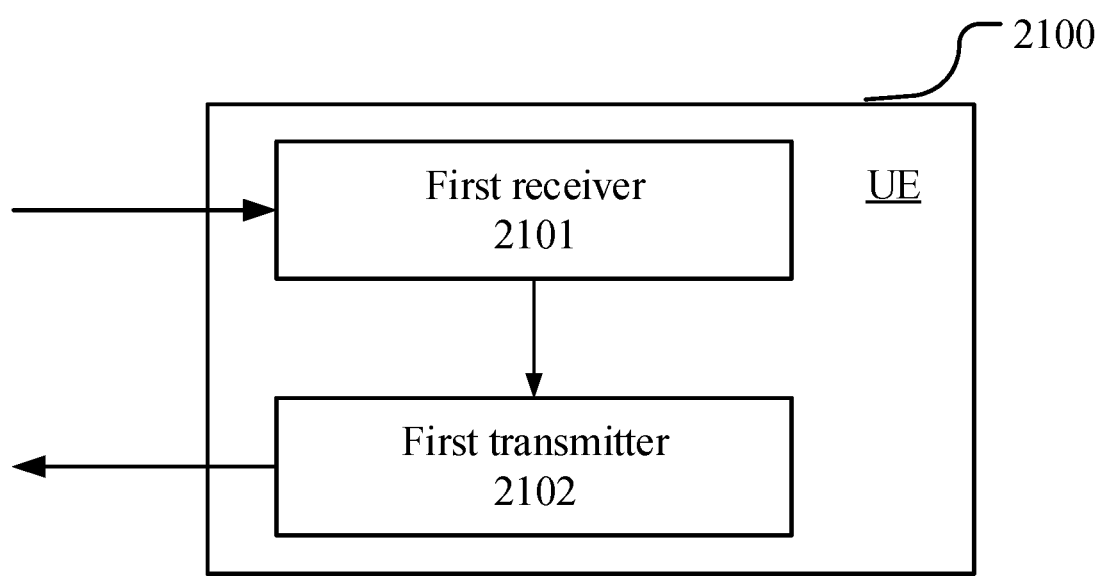
FIG. 21 illustrates a structure block diagram of a processing device in a UE according to one embodiment of the present disclosure.

Embodiment 21 illustrates a structure block diagram of a processing device in a UE; as shown in FIG. 21. In FIG. 21, a processing device 2100 in a UE is mainly composed of a first receiver 2101 and a first transmitter 2102.

In Embodiment 21, the first receiver 2101 receives a first signaling; and the first transmitter 2102 transmits a first radio signal in a first radio resource.

In Embodiment 21, the first radio resource belongs to a first resource set of K resource set(s), and any of the K resource set(s) comprises a positive integer number of radio resource(s), K being a positive integer; the first signaling is used to determine a target parameter set, and the target parameter set is a first parameter set or a second parameter set, the first parameter set comprising a positive integer number of first-type parameter(s) and the second parameter set comprising a positive integer number of second-type parameter(s); the target parameter set is used to determine the first radio resource.

In one embodiment, the first radio signal carries a first bit block, and a number of bits comprised in the first bit block is used to determine the first radio resource.

In one embodiment, the first parameter set comprises K first-type parameter(s), while the second parameter set comprises K second-type parameter(s); the K first-type parameter(s) respectively corresponds(correspond) to the K resource set(s), and the K second-type parameter(s) respectively corresponds(correspond) to the K resource set(s).

In one embodiment, the first receiver 2101 receives K piece(s) of first-type information; herein, the K piece(s) of first-type information respectively indicates(indicate) the K resource set(s).

In one embodiment, the first parameter set comprises K1 first-type parameter(s), while the second parameter set comprises K2 second-type parameter(s); the K1 first-type parameter(s) respectively corresponds(correspond) to K1 resource set(s), while the K2 second-type parameter(s) respectively corresponds(correspond) to K2 resource set(s); when the target parameter set is the first parameter set, K is equal to K1 and the K resource set(s) is(are) the K1 resource set(s) respectively; when the target parameter is the second parameter set, K is equal to K2 and the K resource set(s) is(are) the K2 resource set(s) respectively; K1 and K2 are respectively positive integers.

In one embodiment, the first receiver 2101 receives K1 piece(s) of first-type information and K2 piece(s) of first-type information; herein, the K1 piece(s) of first-type information respectively indicates(indicate) the K1 resource set(s), while the K2 piece(s) of first-type information respectively indicates(indicate) the K2 resource set(s).

In one embodiment, the first receiver 2101 receives J1 piece(s) of first-type sub-information; herein, the J1 piece(s) of first-type sub-information respectively indicates(indicate) J1 first-type parameter(s), each of the J1 first-type parameter(s) belonging to the first parameter set, J1 being a positive integer no greater than a number of first-type parameters comprised in the first parameter set.

In one embodiment, the first receiver 2101 receives J2 piece(s) of first-type sub-information; herein, the J2 piece(s) of first-type sub-information respectively indicates(indicate) J2 second-type parameter(s), each of the J2 second-type parameter(s) belonging to the second parameter set, J2 being a positive integer no greater than a number of second-type parameters comprised in the second parameter set.

In one embodiment, the first signaling comprises a first field, and the first field of the first signaling is used to indicate the first radio resource out of the first resource set.

In one embodiment, the first receiver 2101 receives a second radio signal; herein, the first signaling is used to determine configuration information of the second radio signal, and the first radio signal is a feedback on the second radio signal.

In one embodiment, the first receiver 2101 comprises at least one of the antenna 452, the receiver 454, the receiving processor 456, the multi-antenna receiving processor 458, the controller/processor 459, the memory 460 or the data source 467 in Embodiment 4.

In one embodiment, the first transmitter 2102 comprises at least one of the antenna 452, the transmitter 454, the transmitting processor 468, the multi-antenna transmitting processor 457, the controller/processor 459, the memory 460 or the data source 467 in Embodiment 4.

Embodiment 22

Figure 22:
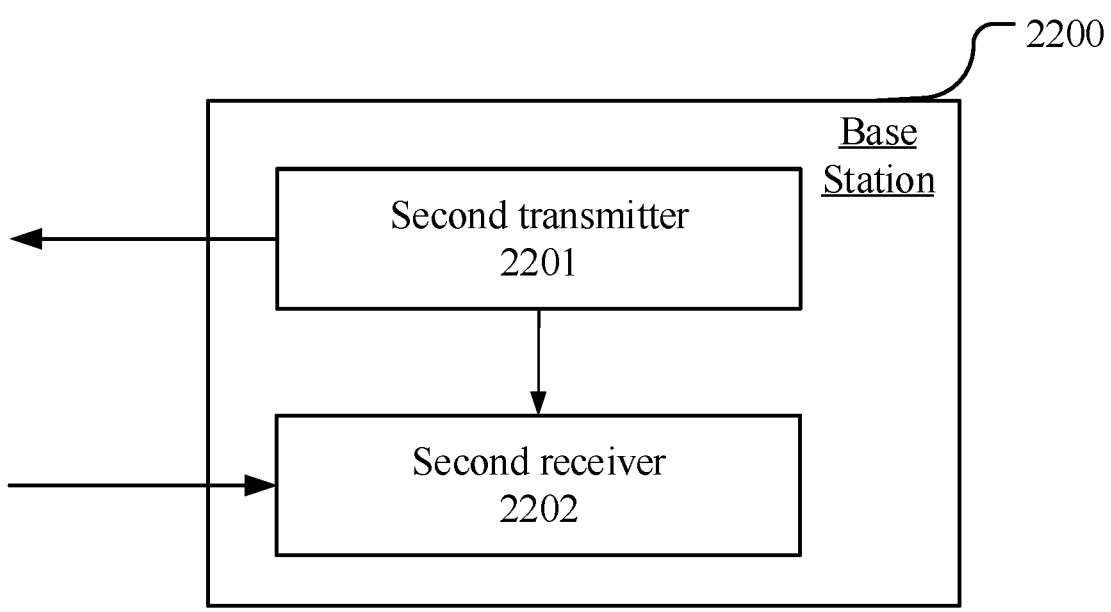
FIG. 22 illustrates a structure block diagram of a processing device in a base station according to one embodiment of the present disclosure.

Embodiment 22 illustrates a structure block diagram of a processing device in a base station; as shown in FIG. 22. In FIG. 22, a processing device 2200 in a base station is mainly composed of a second transmitter 2201 and a second receiver 2202.

In Embodiment 22, the second transmitter 2201 transmits a first signaling; and the second receiver 2202 receives a first radio signal in a first radio resource.

In Embodiment 22, the first radio resource belongs to a first resource set of K resource set(s), and any of the K resource set(s) comprises a positive integer number of radio resource(s), K being a positive integer; the first signaling is used to determine a target parameter set, and the target parameter set is a first parameter set or a second parameter set, the first parameter set comprising a positive integer number of first-type parameter(s) and the second parameter set comprising a positive integer number of second-type parameter(s); the target parameter set is used to determine the first radio resource.

In one embodiment, the first radio signal carries a first bit block, and a number of bits comprised in the first bit block is used to determine the first radio resource.

In one embodiment, the first parameter set comprises K first-type parameter(s), while the second parameter set comprises K second-type parameter(s); the K first-type parameter(s) respectively corresponds(correspond) to the K resource set(s), and the K second-type parameter(s) respectively corresponds(correspond) to the K resource set(s).

In one embodiment, the second transmitter 2201 transmits K piece(s) of first-type information; herein, the K piece(s) of first-type information respectively indicates(indicate) the K resource set(s).

In one embodiment, the first parameter set comprises K1 first-type parameter(s), while the second parameter set comprises K2 second-type parameter(s); the K1 first-type parameter(s) respectively corresponds(correspond) to K1 resource set(s), while the K2 second-type parameter(s) respectively corresponds(correspond) to K2 resource set(s); when the target parameter set is the first parameter set, K is equal to K1 and the K resource set(s) is(are) the K1 resource set(s) respectively; when the target parameter is the second parameter set, K is equal to K2 and the K resource set(s) is(are) the K2 resource set(s) respectively; K1 and K2 are respectively positive integers.

In one embodiment, the second transmitter 2201 transmits K1 piece(s) of first-type information and K2 piece(s) of first-type information; herein, the K1 piece(s) of first-type information respectively indicates(indicate) the K1 resource set(s), while the K2 piece(s) of first-type information respectively indicates(indicate) the K2 resource set(s).

In one embodiment, the second transmitter 2201 transmits J1 piece(s) of first-type sub-information; herein, the J1 piece(s) of first-type sub-information respectively indicates (indicate) J1 first-type parameter(s), each of the J1 first-type parameter(s) belonging to the first parameter set, J1 being a positive integer no greater than a number of first-type parameters comprised in the first parameter set.

In one embodiment, the second transmitter 2201 transmits J2 piece(s) of first-type sub-information; herein, the J2 piece(s) of first-type sub-information respectively indicates (indicate) J2 second-type parameter(s), each of the J2 second-type parameter(s) belonging to the second parameter set, J2 being a positive integer no greater than a number of second-type parameters comprised in the second parameter set.

In one embodiment, the first signaling comprises a first field, and the first field of the first signaling is used to indicate the first radio resource out of the first resource set.

In one embodiment, the second transmitter 2201 transmits a second radio signal; herein, the first signaling is used to determine configuration information of the second radio signal, and the first radio signal is a feedback on the second radio signal.

In one embodiment, the second transmitter 2201 comprises at least one of the antenna 420, the transmitter 418, the transmitting processor 416, the multi-antenna transmitting processor 471, the controller/processor 475 or the memory 476 in Embodiment 4.

In one embodiment, the second receiver 2202 comprises at least one of the antenna 420, the receiver 418, the receiving processor 470, the multi-antenna receiving processor 472, the controller/processor 475 or the memory 476 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be implemented in the form of hardware, or in the form of software function modules. The present disclosure is not limited to any combination of hardware and software in specific forms. The UE and terminal in the present disclosure include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (JOT), RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method performed by a User Equipment (UE) for wireless communications, the method comprising:
   receiving control signaling; and
   transmitting Uplink Control Information (UCI) in a Physical Uplink Control Channel (PUCCH) resource, wherein the PUCCH resource belongs to a PUCCH resource set of K PUCCH resource sets, wherein K is two or more;
   the control signaling is used to determine a target parameter set comprising K parameters, each parameter of the K parameters corresponds to a respective PUCCH resource set of the K PUCCH resource sets, each parameter indicates a maximum payload size that a resource can bear, and the target parameter set is a first UE-specific parameter set or a second UE-specific parameter set, a first target parameter of the target parameter set is predefined such that the respective maximum payload size that the first target parameter indicates does not need configuration and a second target parameter of the target parameter set is not predefined such that the respective maximum payload size that the second target parameter indicates needs configuration, and the target parameter set and a payload size of the UCI are jointly used to determine the PUCCH resource set.

2. The method of claim 1, further comprising receiving downlink control information (DCI) that includes a first field that indicates the PUCCH resource.

3. The method of claim 1, wherein:
   the control signaling is used to determine whether the K PUCCH resource sets are first PUCCH resource sets that correspond to the first UE-specific parameter set or are second PUCCH resource sets that correspond to the second UE-specific parameter set;

or, wherein the method further comprises:

receiving a first plurality of pieces of first-type information and a second plurality of pieces of first-type information;

wherein the control signaling is used to determine whether the K PUCCH resource sets are first PUCCH resource sets that correspond to the first UE-specific parameter set or are second PUCCH resource sets that correspond to the second UE-specific parameter set; and wherein the first plurality of pieces of first-type information respectively indicate the first PUCCH resource sets, and the second plurality of pieces of first-type information respectively indicate the second PUCCH resource sets.

4. The method of claim 3, wherein the control signaling includes an identifier that is used to determine whether the K PUCCH resource sets are the first PUCCH resource sets or are the second PUCCH resource sets, wherein the identifier belongs to either a first identifier subset or a second identifier subset, and the first identifier subset includes a Cell Radio Network Temporary Identifier (C-RNTI).

5. The method of claim 1, wherein the target parameter set includes a minimum parameter that indicates a size that is no less than the payload size of the UCI, and the PUCCH resource set corresponds to the minimum parameter.

6. A method performed by a base station for wireless communications, the method comprising:

transmitting control signaling; and receiving Uplink Control Information (UCI) in a Physical Uplink Control Channel (PUCCH) resource, wherein the PUCCH resource belongs to a PUCCH resource set of K PUCCH resource sets, wherein K is two or more;

the control signaling is used to determine a target parameter set comprising K parameters, each parameter of the K parameters corresponds to a respective PUCCH resource set of the K PUCCH resource sets, each parameter indicates a maximum payload size that a resource can bear, and the target parameter set is a first UE-specific parameter set or a second UE-specific parameter set, a first target parameter of the target parameter set is predefined such that the respective maximum payload size that the first target parameter indicates does not need configuration and a second target parameter of the target parameter set is not predefined such that the respective maximum payload size that the second target parameter indicates needs configuration, and the target parameter set and a payload size of the UCI are jointly used to determine the PUCCH resource set.

7. The method of claim 6, further comprising transmitting downlink control information (DCI) that includes a first field that indicates the PUCCH resource.

8. The method of claim 6, wherein:

the control signaling is used to determine whether the K PUCCH resource sets are first PUCCH resource sets that correspond to the first UE-specific parameter set or are second PUCCH resource sets that correspond to the second UE-specific parameter set;

or wherein the method further comprises:

transmitting a first plurality of pieces of first-type information and a second plurality of pieces of first-type information;

wherein the control signaling is used to determine whether the K PUCCH resource sets are first PUCCH resource sets that correspond to the first UE-specific parameter set or are second PUCCH resource sets that correspond to the second UE-specific parameter set; and wherein the first plurality of pieces of first-type information respectively indicate the first PUCCH resource sets, and the second plurality of pieces of first-type information respectively indicate the second PUCCH resource sets.

9. The method of claim 8, wherein the control signaling includes an identifier, and wherein whether the K PUCCH resource sets are the first PUCCH resource sets or are the second PUCCH resource sets is based on the identifier, wherein the identifier belongs to either a first identifier subset or a second identifier subset, and the first identifier subset includes a Cell Radio Network Temporary Identifier (C-RNTI).

10. The method of claim 6, wherein the target parameter set includes a minimum parameter that indicates a size that is no less than the payload size of the UCI, and the PUCCH resource set corresponds to the minimum parameter.

11. A User Equipment (UE) for wireless communications, comprising:

a receiver configured to receive control signaling; and a transmitter configured to transmit Uplink Control Information (UCI) in a Physical Uplink Control Channel (PUCCH) resource, wherein the PUCCH resource belongs to a PUCCH resource set of K PUCCH resource sets, wherein K is two or more;

the control signaling is used to determine a target parameter set comprising K parameters, each parameter of the K parameters corresponds to a respective PUCCH resource set of the K PUCCH resource sets, each parameter indicates a maximum payload size that a resource can bear, and the target parameter set is a first UE-specific parameter set or a second UE-specific parameter set, a first target parameter of the target parameter set is predefined such that the respective maximum payload size that the first target parameter indicates does not need configuration and a second target parameter of the target parameter set is not predefined such that the respective maximum payload size that the second target parameter indicates needs configuration, and the target parameter set and a payload size of the UCI are jointly used to determine the PUCCH resource set.

12. The UE of claim 11, wherein the receiver is further configured to receive downlink control information (DCI) that includes a first field that indicates the PUCCH resource.

13. The UE of claim 11, wherein:

the control signaling is used to determine whether the K PUCCH resource sets are first PUCCH resource sets that correspond to the first UE-specific parameter set or are second PUCCH resource sets that correspond to the second UE-specific parameter set;

or, the receiver is further configured to receive a first plurality of pieces of first-type information and a second plurality of pieces of first-type information;

wherein the control signaling is used to determine whether the K PUCCH resource sets are first PUCCH resource sets that correspond to the first UE-specific parameter set or are second PUCCH resource sets that correspond to the second UE-specific parameter set; and wherein the first plurality of pieces of first-type information respectively indicate the first PUCCH resource sets, and the second plurality of pieces of first-type information respectively indicate the second PUCCH resource sets.

14. The UE of claim 13, wherein the control signaling includes an identifier that is used to determine whether the K PUCCH resource sets are the first PUCCH resource sets or are the second PUCCH resource sets, wherein the identifier belongs to either a first identifier subset or a second identifier subset, and the first identifier subset includes a Cell Radio Network Temporary Identifier (C-RNTI).

15. The UE of claim 11, wherein the target parameter set includes a minimum parameter that indicates a size that is no less than the payload size of the UCI, and the PUCCH resource set corresponds to the minimum parameter.

16. A base station for wireless communications, the base station comprising:
 a transmitter configured to transmit control signaling; and
 a receiver configured to receive Uplink Control Information (UCI) in a Physical Uplink Control Channel (PUCCH) resource, wherein the PUCCH resource belongs to a PUCCH resource set of K PUCCH resource sets, wherein K is two or more;
 the control signaling is used to determine a target parameter set comprising K parameters, each parameter of the K parameters corresponds to a respective PUCCH resource set of the K PUCCH resource sets, each parameter indicates a maximum payload size that a resource can bear, and the target parameter set is a first UE-specific parameter set or a second UE-specific parameter set, a first target parameter of the target parameter set is predefined such that the respective maximum payload size that the first target parameter indicates does not need configuration and a second target parameter of the target parameter set is not predefined such that the respective maximum payload size that the second target parameter indicates needs configuration, and the target parameter set and a payload size of the UCI are jointly used to determine the PUCCH resource set.

17. The base station of claim 16, wherein the transmitter is further configured to transmit downlink control information (DCI) that includes a first field that indicates the PUCCH resource.

18. The base station of claim 16, wherein;
 the control signaling is used to determine whether the K PUCCH resource sets are first PUCCH resource sets that correspond to the first UE-specific parameter set or are second PUCCH resource sets that correspond to the second UE-specific parameter set;
 or,
 the transmitter is further configured to transmit a first plurality of pieces of first-type information and K2 a second plurality of pieces of first-type information;
 wherein the control signaling is used to determine whether the K PUCCH resource sets are first PUCCH resource sets that correspond to the first UE-specific parameter set or are second PUCCH resource sets that correspond to the second UE-specific parameter set; and wherein the first plurality of pieces of first-type information respectively indicate the first PUCCH resource sets, and the second plurality of pieces of first-type information respectively indicate the second PUCCH resource sets.

19. The base station of claim 18, wherein the control signaling includes an identifier, and wherein whether the K PUCCH resource sets are the first PUCCH resource sets or are the second PUCCH resource sets is based on the identifier, wherein the identifier belongs to either a first identifier subset or a second identifier subset, and the first identifier subset includes a Cell Radio Network Temporary Identifier (C-RNTI).

20. The base station of claim 16, wherein the target parameter set includes a minimum parameter that indicates a size that is no less than the payload size of the UCI, and the PUCCH resource set corresponds to the minimum parameter.

* * * * *